US011102164B1

(12) United States Patent
Gupta et al.

(10) Patent No.: US 11,102,164 B1
(45) Date of Patent: Aug. 24, 2021

(54) SOFTWARE DEFINED NETWORKING OPERATIONS FOR PROGRAMMABLE CONNECTED DEVICES

(71) Applicant: MICROSOFT TECHNOLOGY LICENSING, LLC, Redmond, WA (US)

(72) Inventors: Avijit Gupta, Redmond, WA (US); Anish Sagar Narsian, Cupertino, CA (US); Hang Kwong Lee, Redmond, WA (US); Sumit Sharad Dhoble, Redmond, WA (US); Manasi Deval, Redmond, WA (US); James Wesley Boerner, Marysville, WA (US); Rishabh Tewari, Sammamish, WA (US); Pranjal Shrivastava, Redmond, WA (US); Sonia Sharma, Woodinville, WA (US); Deepak Bansal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/109,120

(22) Filed: Dec. 1, 2020

Related U.S. Application Data

(60) Provisional application No. 63/078,283, filed on Sep. 14, 2020.

(51) Int. Cl.
G06F 15/173 (2006.01)
H04L 29/12 (2006.01)
(Continued)

(52) U.S. Cl.
CPC ........ *H04L 61/103* (2013.01); *H04L 43/0882* (2013.01); *H04L 45/04* (2013.01);
(Continued)

(58) Field of Classification Search
CPC ... H04L 61/103; H04L 43/0882; H04L 45/04; H04L 45/586; H04L 45/64; H04L 61/6022; H04L 67/142
(Continued)

(56) References Cited

U.S. PATENT DOCUMENTS 8,166,205 B2 * 4/2012 Farinacci ............. H04L 61/106
  709/249
9,009,304 B2 * 4/2015 Malloy ............. H04L 29/12028
  709/224

(Continued)

FOREIGN PATENT DOCUMENTS

CN 103001883 A 3/2013
CN 104102615 A 10/2014

OTHER PUBLICATIONS

"Ethernet Communication Interface for the FPGA", Retrieved from https://web.archive.org/web/20140827001030/https:/people.ece.cornell.edu/land/courses/ece5760/FinalProjects/f2011/mis47_ayg6/mis47_ayg6/, Jun. 27, 2014, 13 Pages.
(Continued)

Primary Examiner — Atta Khan
(74) Attorney, Agent, or Firm — Newport IP, LLC; Han Gim

(57) ABSTRACT

A virtual network comprising virtual machines executing at a computing environment is implemented. A software defined networking (SDN) appliance is configured to provide a connection to computing resources via a virtual network of a virtual computing environment. The SDN appliance is configured to apply policies of the virtual computing environment to data traffic on the virtual network. The SDN appliance is operable to interact with multiple network devices that are configured to act as a hardware acceleration device for processing data traffic. Virtual addresses are assigned to the network devices. The
(Continued)

SDN appliance executes a virtual switch configured to identify data traffic sent to or received from a host and act as a proxy for the network devices and respond on their behalf.

20 Claims, 25 Drawing Sheets

(51) Int. Cl.
  *H04L 12/26* (2006.01)
  *H04L 12/715* (2013.01)
  *H04L 12/713* (2013.01)
  *H04L 29/08* (2006.01)
(52) U.S. Cl.
  CPC ............ *H04L 45/586* (2013.01); *H04L 45/64* (2013.01); *H04L 61/6022* (2013.01); *H04L 67/142* (2013.01)
(58) Field of Classification Search
  USPC ........................................................ 709/223
  See application file for complete search history.

(56) References Cited

U.S. PATENT DOCUMENTS 9,154,327 B1    10/2015    Marino et al.
10,621,127 B2    4/2020    Abel et al.

OTHER PUBLICATIONS

Lofgren, et al., "An Analysis of FPGA-based UDP/IP Stack Parallelism for Embedded Ethernet Connectivity", In Proceedings of 23rd Norchip Conference, Nov. 21, 2005, 11 Pages.

Mishra, et al., "REoN: A Protocol for Reliable Software-Defined FPGA Partial Reconfiguration over Network", In Proceedings of International Conference on ReConFigurable Computing and FPGAs (ReConFig), Nov. 30, 2016, 7 Pages.

Unnikrishnan, et al., "Scalable Network Virtualization Using FPGAs", In Proceedings of the 18th Annual ACM/SIGDA International Symposium Field Programmable Gate Arrays, Feb. 21, 2010, 10 Pages.

\* cited by examiner

BGP
router bgp 64610
template peer BGP_SPEAKER
 ebgp-multihop 255
 address-family ipv4 uFPGAast
 send-community
 route-map FROM_BGP_SPEAKER in
 route-map TO_BGP_SPEAKER out
Dynamic Neighbor Statements ##
 neighbor 10.202.72.0/26
 inherit peer BGP_SPEAKER
 remote-as 65511
 update-source loopback0

SW
interface Vlan1201
 ip address 10.202.72.1/27
interface Loopback0
 ip address 1.1.1.1

FIG. 22

SOFTWARE DEFINED NETWORKING OPERATIONS FOR PROGRAMMABLE CONNECTED DEVICES

CROSS-REFERENCE TO RELATED APPLICATION

This application claims priority to U.S. Provisional Application Ser. No. 63/078,283, entitled "SUPPORTING AND OPTIMIZING SOFTWARE DEFINE NETWORKING OPERATIONS FOR PROGRAMMABLE CONNECTED DEVICES," filed Sep. 14, 2020, which is hereby incorporated herein in its entirety.

BACKGROUND

A data center may house computer systems and various networking, storage, and other related components. Data centers may, for example, be used by service providers to provide computing services to businesses and individuals as a remote computing service or provide "software as a service" (e.g., cloud computing). In some cases, such users may wish to incorporate custom computing or storage assets, while taking advantage of the cloud computing capabilities of the data center. However, the custom assets may not have the capability of applying policies to the users' data. In some scenarios, cloud computing services may employ compute instances that are injected into a customer's virtual network using a dedicated data plane to isolate data from that of other customers. However, security policies implemented on a customer's virtual network can break management plane connectivity to the injected compute instances, which can disrupt the resource deployment.

It is with respect to these considerations and others that the disclosure made herein is presented.

SUMMARY

Users of a remote computing service may be provided the option of incorporating custom or third-party hardware such as high capacity processing machines or storage devices into their virtual networks in the cloud. For example, a bare-metal server may be deployed in a network. A bare-metal server may refer to a server that is a single-tenant physical server that is not shared between users. Such custom hardware and other hybrid cloud scenarios may require software defined networking (SDN) policies in order to access the cloud provider's services. However, devices such as a bare-metal server may not have all of the capabilities of a host on the SDN. For example, the bare-metal server may not be able to execute the host networking stack.

It is desirable to apply existing user policies to the custom hardware without impacting the performance of the user's virtual machines in their virtual network. One way this can be accomplished is by programming network devices such as the top-of-rack (ToR) switches for routing traffic into the customer's virtual network. However, the options for programming network devices may be limited. For example, loading the software defined network policy stack on a network device may not be possible due to hardware restrictions and limitations imposed by the manufacturer of the network device.

SDN policies typically cannot be applied to non-VM workloads. SDN is conventionally implemented on a general-purpose compute node. The SDN control plane may program a host to provide core network functions such as security. For example, the networking SDN stack may be coupled with the hosts. However, there may be no way to scale out the host networking stack. Capacity may thus be limited to what can be performed on a single host. Furthermore, traffic that needs additional SDN policies, such as a private link, must be sent through several software hops. This can cause the performance of the networking services to drop, which can be a barrier for migration of high throughput workloads and applications to the cloud.

Systems and methods are disclosed herein for enabling such integration of hardware services, while maintaining a seamless user experience. In some embodiments, the scenarios described above may benefit from implementation of systems and methods for disaggregating policy processing off of the host. Disaggregation may also enable greater networking scale in order to match increasing demands from customers. In some embodiments, the SDN may implement a middle appliance, which may be referred to herein as an SDN appliance. In some embodiments, the SDN appliance may enable the use of the SDN control plane to manage the network devices while providing high availability and fault tolerance, as further described herein. The SDN appliance provides a model to separate the application of SDN policies and configurations into a different computation environment. The operation of the appliance is transparent to the virtual networks. Furthermore, the SDN appliance provides an opportunity to amortize the capabilities of the computation environment over many more virtual networks than was previously possible.

In the illustrated example scenarios, SDN capabilities may be enhanced by disaggregating policy enforcement from the host and moving it onto an SDN appliance strategically placed in the network. The SDN appliance may be configured to enforce SDN policies and perform associated transforms, and load balancer policies. In some embodiments, in order to move host SDN policy enforcement completely off the host, in an embodiment, an SDN appliance including an FPGA may be used to move SDN policy enforcement off the host. Implementation of the SDN appliance can free up work/compute capability for customer workloads and enable more predictable performance. The SDN appliance can be placed in datacenters to dynamically provide for any scale or feature that may not be possible or available on the host. Such features may include VM scaling, offloading of packet processing, and for flexible SDN policy application.

Through incorporation of the SDN appliance, a bare-metal server may connect to a virtual machine in another virtual network in the same region when regional virtual network peering is established, for example. Furthermore, an outbound routing table may be assigned on the bare-metal traffic. In this case, the SDN appliance may provide connectivity to address prefixes of all regionally peered virtual networks. Additionally, global peering may be supported as well. The present disclosure describes technologies that address various issues related to the above described scenarios.

Certain connected network devices that contain a programmable ASIC (e.g., FPGAs) may lack the networking stack to be able to interact with common networking protocols such as ARP and LACP which are critical for routing and monitoring. Such connected network devices may, for example, be on a server that contains a network interface capable of accepting control traffic.

The disclosure describes embodiments for modifying an ARP framework that runs on network devices such that it can provide connectivity to programmable network devices that do not have a native layer 3 networking stack running on them (e.g., FPGAs). Such devices can share a common network interface on the server to bootstrap network connectivity (e.g., ARP). The agents and drivers on the SDN appliance can program and communicate with these connected devices to complete the bootstrapping of network connectivity.

In an embodiment, virtual IP addresses may be assigned to the FPGAs. Additionally, to enable responses when packets are addressed to the virtual IP address, the network driver running on the SDN appliance may act as a proxy for the FPGAs and respond on their behalf.

More generally, virtual MAC and IP addresses may be assigned to connected devices, having an agent that knows the mapping of these connected devices to a (virtual IP, virtual MAC) pair and a driver that is programmed by this agent, can process network bootstrapping requests and can send the bootstrapping responses through these connected devices.

The described embodiments may support multiple FPGAs and other connected devices on SDN appliances in multiple different network and physical topologies.

The described techniques can allow for virtual computing environments to support a variety of configurations including custom hardware and hybrid architectures while maintaining efficient use of computing resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 22 is a diagram illustrating an architecture in accordance with the present disclosure;

DETAILED DESCRIPTION

Figure 1:
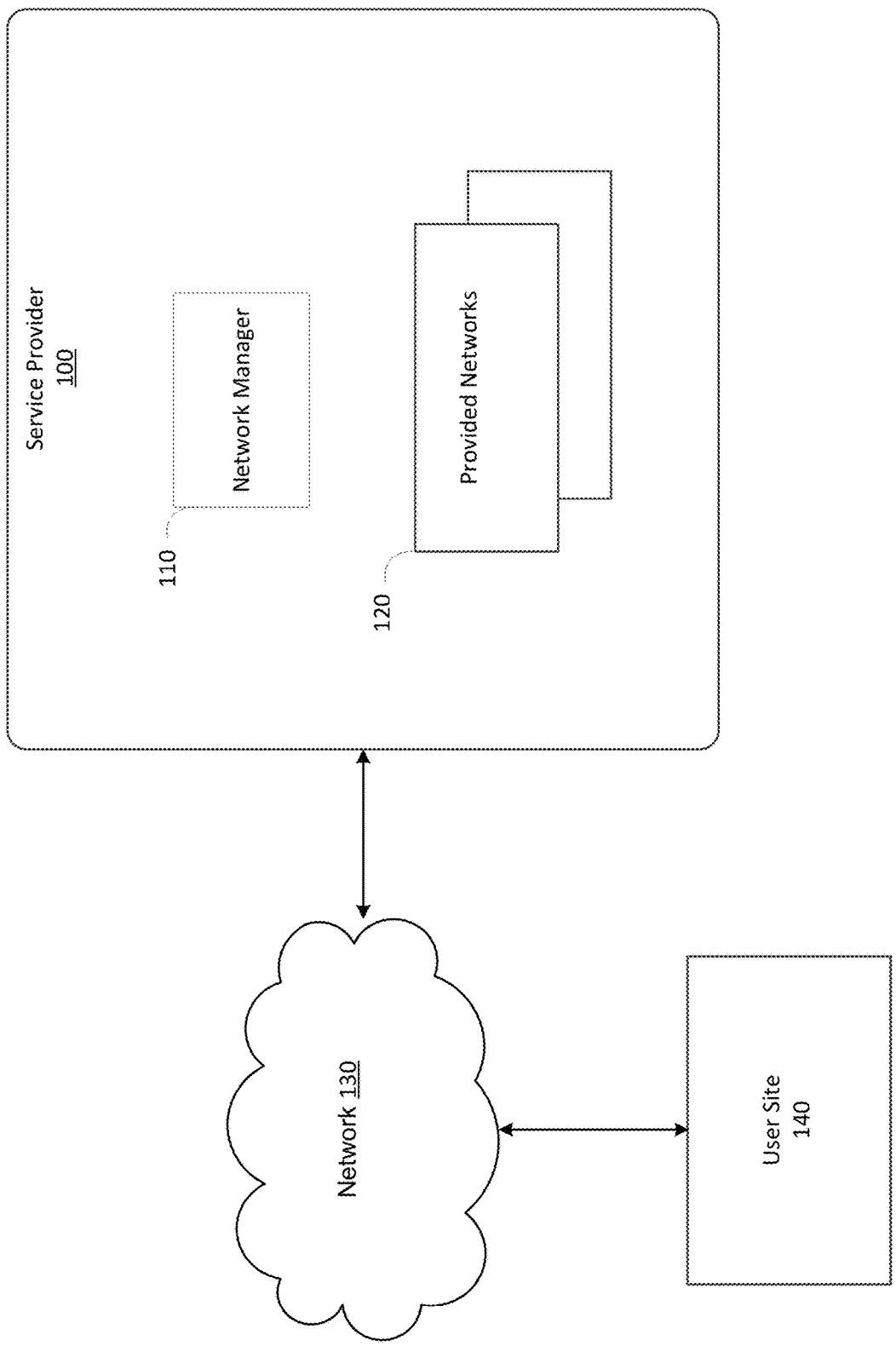
FIG. 1 is a diagram illustrating an example architecture in accordance with the present disclosure.

In some computing environments that provide virtualized computing and storage services, various computing and network services may be configured to enable users to incorporate a variety of configurations including custom hardware and hybrid architectures, thereby extending capabilities of the services. For example, an enterprise may want to deploy dedicated hardware (e.g., bare-metal servers). Users of virtualized computing resources may benefit in many ways by deploying resources such as virtual machines on dedicated resources. Incorporation of dedicated hardware for aspects of virtualized computing services may enable users to more effectively meet data residency, compliance, latency, and other requirements, while continuing to benefit from many of the advantages of utilizing remote and/or virtualized computing services, such as scalability and flexibility.

The disclosed embodiments enable various scenarios for implementing dedicated hardware and other hybrid architectures. The disclosed embodiments further enable such extensions to be implemented in a manner that reduces the cost and complexity of such networks, allowing for more efficient use of computing, storage, and network resources.

Efficient implementation of the end-to-end capability service using hybrid architectures by the cloud service provider can enable an experience that is seamless and more consistent between conventional and hybrid user footprints. The integration of multi-tenant and single-tenant resources with a comprehensive resource management approach can minimize the overhead for the user, who will not need to address policy enforcement issues and perform other complex management tasks. The effective distribution of the described disaggregation functions can be determined based on the implications for various performance and security implications such as latency and data security.

In some embodiments disclosed herein, a flexible network interface may be implemented. As used herein, such a flexible network interface may be referred to as a flexible network interface card, a floating network interface card, or fNIC.

An fNIC associated with a virtual machine (VM) in a cloud computing network may be configured to be elastically attached and detached from a parent NIC to thereby enable the virtual machine to simultaneously be connected to multiple different virtual networks (VNets) and/or subnets that are associated with the same or different subscriptions. The fNIC may, for example, enable a service provider to inject compute instances into an existing VNet in which the data plane uses a dedicated network interface to connect the customer's VNet, while another dedicated network interface provides management plane connectivity to the service provider. Such a configuration provides data plane isolation for the customer's VNet to comply with applicable security policies without disrupting management traffic between the injected resources and the service provider. Using a cross-subscription architecture, the parent NIC may be associated with a service subscription for management traffic to the injected compute instances, for example, and an attached fNIC associated with a customer subscription for data traffic.

In addition to the isolation provided between data and management traffic to the injected compute instances, utilization of the fNIC provides additional flexibility for cloud computing customers and service providers. For example, compute instances can be simultaneously connected to different subnets (which may have different security policies) in a customer's VNet. Such capabilities provided by the fNIC may advantageously promote efficient organization and consumption of resources in the customer's enterprise.

Utilization of the fNIC can support implementation of a multi-tenant architecture to provide access by multiple tenants to a single shared VM. Each fNIC attached to a parent NIC associated with a service provider may use a unique network partition identifier (NPI) for each tenant subscription. The fNIC provides flexible implementation of multi-tenancy while enabling granular networking policies to be enforced to a particular discrete computing workload, rather than across the entire VM. A virtual filtering platform extension underlying the parent NIC may be configured to enforce specific networking policies that are tied to each fNIC including, for example, bandwidth metering, access control, VNet data encapsulation and addressing, etc. The data planes for each tenant on the VM may be operated concurrently yet are isolated from each other to ensure that data processing for one tenant has no impact on others.

The fNIC can also provide pre-provisioning of additional computing resources with associated policies that can be rapidly deployed on demand while reducing the time that is conventionally needed to inject resources into a customer's VNet. In such a "hot attach" architecture, a service provider can, for example, have a pool of already active compute instances on standby in a VM. The service can attach an fNIC to a parent NIC and associate it with the customer's subscription to provide access to the customers VNet. Management and data planes operate independently to prevent disruption while providing conformance with applicable networking and security policies.

Referring to the appended drawings, in which like numerals represent like elements throughout the several FIGURES, aspects of various technologies for network disaggregation techniques and supporting technologies will be described. In the following detailed description, references are made to the accompanying drawings that form a part hereof, and which are shown by way of illustration specific configurations or examples.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
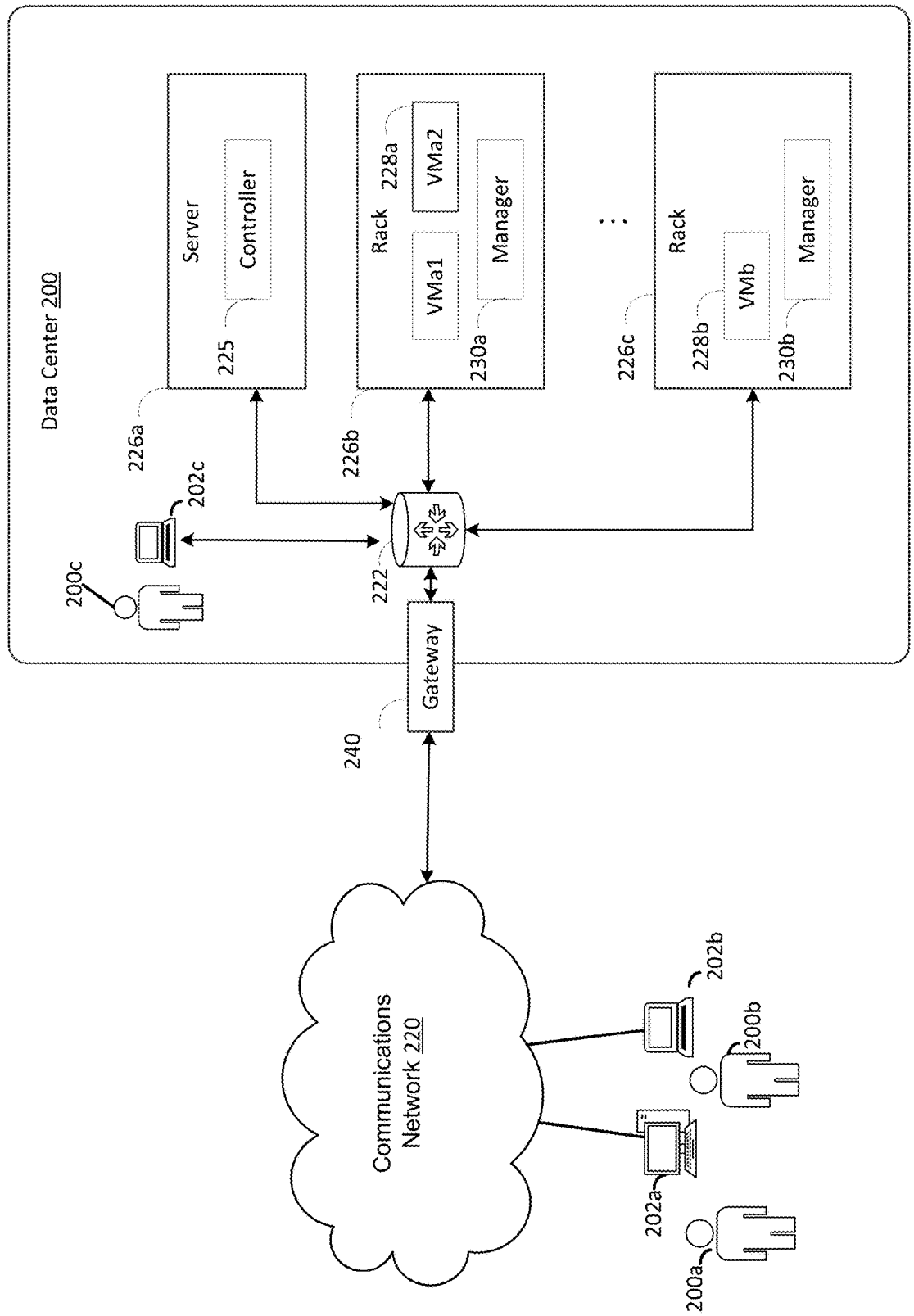
FIG. 2 is a diagram illustrating a data center in accordance with the present disclosure.

FIG. 2 illustrates an example computing environment in which the embodiments described herein may be implemented. FIG. 2 illustrates a data center 200 that is configured to provide computing resources to users 200a, 200b, or 200c (which may be referred herein singularly as "a user 200" or in the plural as "the users 200") via user computers 202a, 202b, and 202c (which may be referred herein singularly as "a computer 202" or in the plural as "the computers 202") via a communications network 220. The computing resources provided by the data center 200 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may correspond to service provider 100 in FIGS. 1 and 2, or edge site 150 of FIG. 2. Data center 200 may include servers 226a, 226b, and 226c (which may be referred to herein singularly as "a server 226" or in the plural as "the servers 226") that may be standalone or installed in server racks, and provide computing resources available as virtual machines 228a and 228b (which may be referred to herein singularly as "a virtual machine 228" or in the plural as "the virtual machines 228"). The virtual machines 228 may be configured to execute applications such as Web servers, application servers, media servers, database servers, and the like. Other resources that may be provided include data storage resources (not shown on FIG. 2) and may include file storage devices, block storage devices, and the like. Servers 226 may also execute functions that manage and control allocation of resources in the data center, such as a controller 225. Controller 225 may be a fabric controller or another type of program configured to manage the allocation of virtual machines on servers 226.

Referring to FIG. 2, communications network 220 may, for example, be a publicly accessible network of linked networks and may be operated by various entities, such as the Internet. In other embodiments, communications network 220 may be a private network, such as a corporate network that is wholly or partially inaccessible to the public.

Communications network 220 may provide access to computers 202. Computers 202 may be computers utilized by users 200. Computer 202a, 202b or 202c may be a server, a desktop or laptop personal computer, a tablet computer, a smartphone, a set-top box, or any other computing device capable of accessing data center 200. User computer 202a or 202b may connect directly to the Internet (e.g., via a cable modem). User computer 202c may be internal to the data center 200 and may connect directly to the resources in the data center 200 via internal networks. Although only three user computers 202a, 202b, and 202c are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 226 may be configured to provide the computing resources described above. One or more of the servers 226 may be configured to execute a manager 230a or 230b (which may be referred herein singularly as "a manager 230" or in the plural as "the managers 230") configured to execute the virtual machines. The managers 230 may be a virtual machine monitor (VMM), fabric controller, or another type of program configured to enable the execution of virtual machines 228 on servers 226, for example.

It should be appreciated that although the embodiments disclosed above are discussed in the context of virtual machines, other types of implementations can be utilized with the concepts and technologies disclosed herein.

In the example data center 200 shown in FIG. 2, a network device 222 may be utilized to interconnect the servers 226a and 226b. Network device 222 may comprise one or more switches, routers, or other network devices. Network device 222 may also be connected to gateway 240, which is connected to communications network 220. Network device 222 may facilitate communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
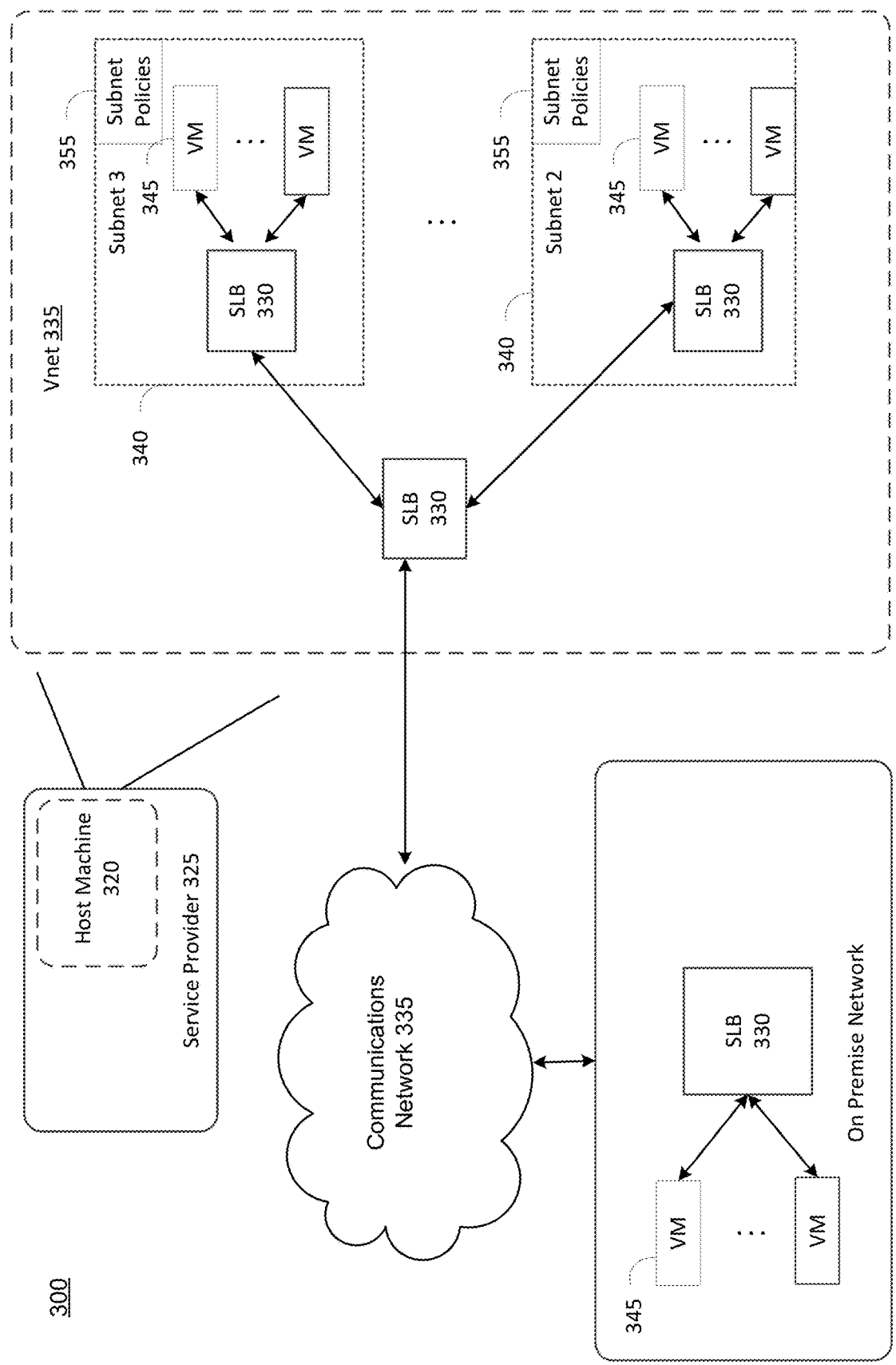
FIG. 3 is a diagram illustrating an example architecture in accordance with the present disclosure.

FIG. 3 shows an illustrative cloud computing environment 300 in which a customer network 305 includes multiple portions including an on-premises network 330 and a virtual network (VNet) 335. The customer network in this example is a hybrid network but other network configurations may also be utilized depending on the particular requirements of the user scenario. The VNet may be physically implemented using one or more host machines 320 that are operated by a cloud service provider 325. It is noted that the diagram in FIG. 3 is simplified for clarity in exposition and typical networking equipment such as firewalls, routers, and the like are not shown.

The on-premises network and VNet are typically operatively coupled using instances of gateways 330, or other networking devices, over a communication network 335 which may include, for example, private and/or public networking infrastructure using various combinations of connectivity services. The VNet may include multiple subnets 340 that each include one or more instances of virtual machines 345 that are typically connected using load balancers 350 and/or other networking devices. Security and other networking policies (collectively indicated by reference numeral 355) are typically applicable to each subnet.

The networking policies are typically different for each subnet, but they can be the same and/or overlap in some cases.

Figure 4:
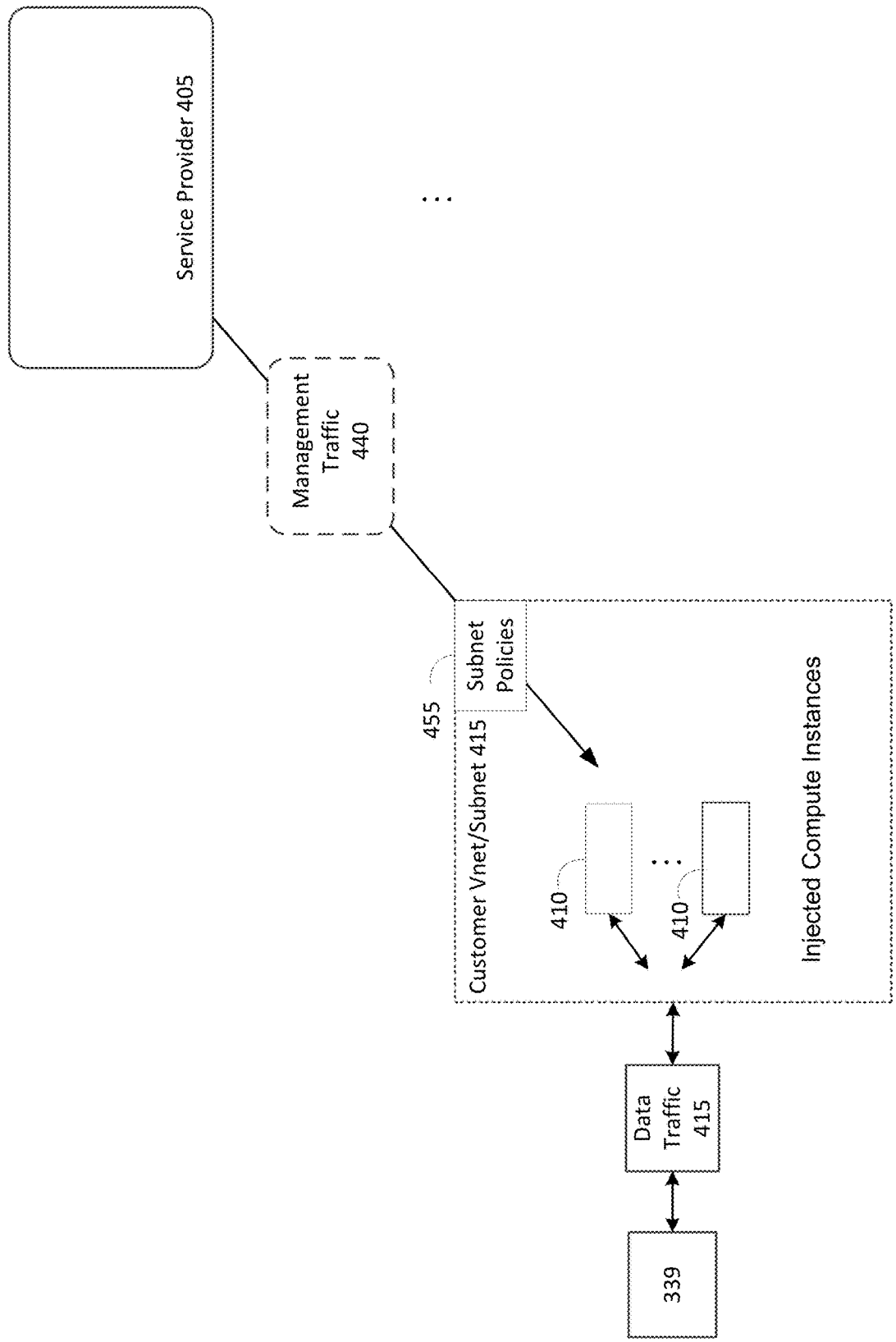
FIG. 4 is a diagram illustrating injected instances in accordance with the present disclosure.

FIG. 4 shows an illustrative service from a service resource provider 405 that injects dedicated compute instances 410 into the customer's VNet 415. For example, in some implementations, such service resource providers may be implemented using a Platform as a Service (PaaS) to provide search, content delivery, etc. The service resource provider may be associated with the cloud service provider 405 or be a third party in some cases. Service resource providers may inject compute instances or other resources into a VNet when provisioning a given cloud computing service that interacts with customer data traffic 415 that enters and exits from the gateway 330. As shown in FIG. 4, security or networking policies 455 implemented by a customer to protect a VNet or subnet are utilized to filter traffic and provide end node control at the VM/VNet/subnet for all network traffic flows.

The networking policies may block management traffic 440 by preventing management plane access from the NRP 405 which causes service disruptions. The service disruption may be addressed by an fNIC that is attachable and detachable from a parent network interface controller fNIC in an elastic manner as discussed below. The separation of management and data planes may be one characteristic of a software defined network (SDN). Thus, the customer's network 405 may be based in whole or part on SDN technologies, in some implementations, as described below.

Figure 5:
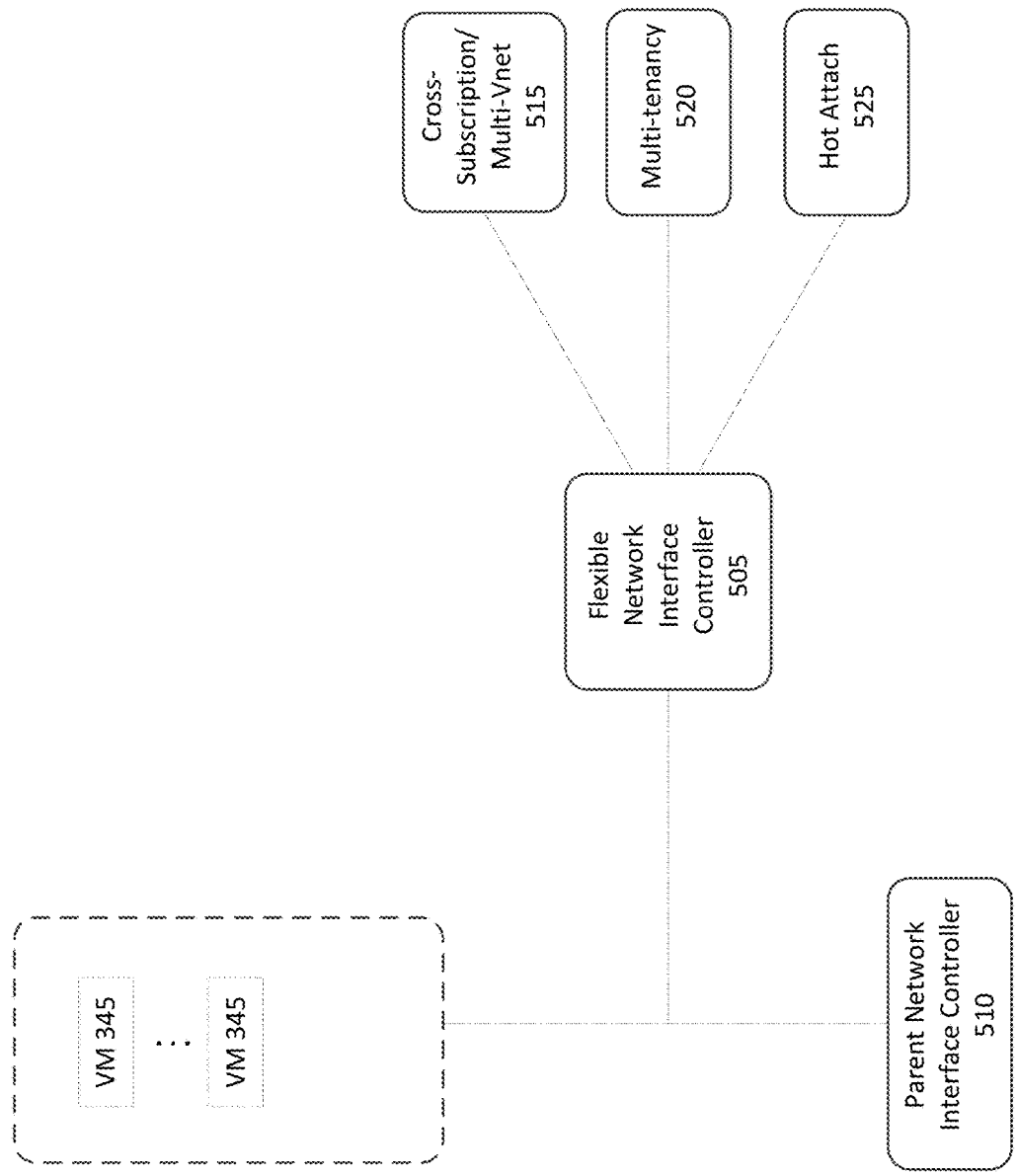
FIG. 5 is a diagram illustrating an architecture for implementing virtual services in accordance with the present disclosure.

FIG. 5 shows an illustrative fNIC 505 that may be utilized to support a variety of scenarios that is attached to a parent NIC 510. The parent NIC may be implemented in this example as virtualization of a network interface at the host supporting the VM 345 using a container model, although physical embodiments may be utilized in some scenarios. An fNIC may be implemented using a compartment of the container as a child network interface configuration. Essentially, a compute instance may be created with a placeholder network interface such that multiple fNICs can be dynamically put up and taken down by respectively being attached and detached from the instance.

The parent NICs and fNICs provide identity, connectivity, and discoverability for the VMs in the customer's VNet. An fNIC enables flexibility for various VM deployment scenarios by its capabilities for attachment and detachment from the parent NIC. The flexibility enables rapid provisioning of a variety of cloud-computing features and services on an on-demand basis without needing to alter the fundamental workflow in a given VM/VNet/subnet while conforming with applicable networking policies.

As shown in FIG. 5, the use scenarios illustratively include, for example, cross-subscriptions and multi-VNet homing (indicated by reference numeral 515), multi-tenancy and subnet sharing 520, and pre-provisioning of resources or "hot attach" 525.

Figure 6:
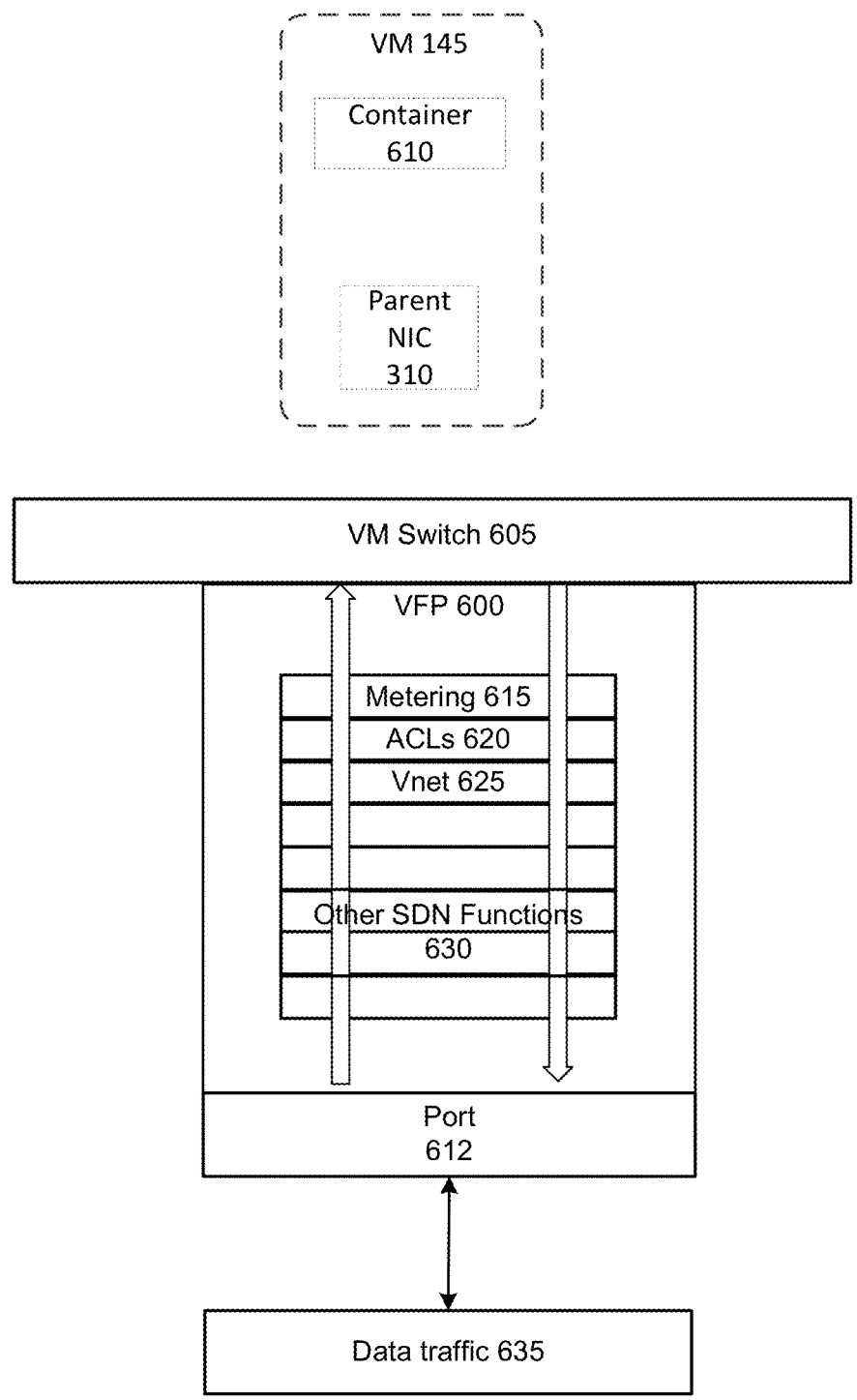
FIG. 6 is a diagram illustrating an architecture for implementing virtual services in accordance with the present disclosure.

FIG. 6 shows an example virtual filtering platform (VFP) 600 extension to a VM switch 605 that enables data path isolation in the multi-tenant architecture discussed herein by enforcing specific networking policies that are tied to each container 610 that is used to implement a parent NIC to which an fNIC is attached based on the NPI. The VM switch may logically underly the parent NIC 310 and may provide a port 612 to each VM supported by the NIC. The VFP may divide networking policies applicable to the port into layers that include rules that govern SDN behaviors and characteristics. The virtual filtering platform may provide capabilities to enforce policies and transform or tunnel data packets in a given computing workload that are entering and leaving the VM 145. The virtual filtering platform may include a central data packet processor (not shown) that performs the processing of data packets.

The networking policy layers may include those, in this example, relating to metering 615, access control lists (ACLs) 620, VNet addressing/routing 625, and other various SDN functions or features 630 which may include, for example, those pertaining to routing, tunneling, filtering, address translation, encryption, decryption, encapsulation, de-encapsulation, or quality of service (QoS). The packet processor in the VFP 600 may evaluate the packets of data traffic 635 as they traverse the networking policy layers, matching rules in each layer based on a state of the packet after an action is performed in the preceding layer. Returning packets may traverse the layers in the opposite direction and may be processed by the VFP to match the applicable rules. The rules used to express the networking policies may be entities that perform actions on matching packets (e. g., using a match action table model) as the computing workload is processed by the VFP.

Figure 7:
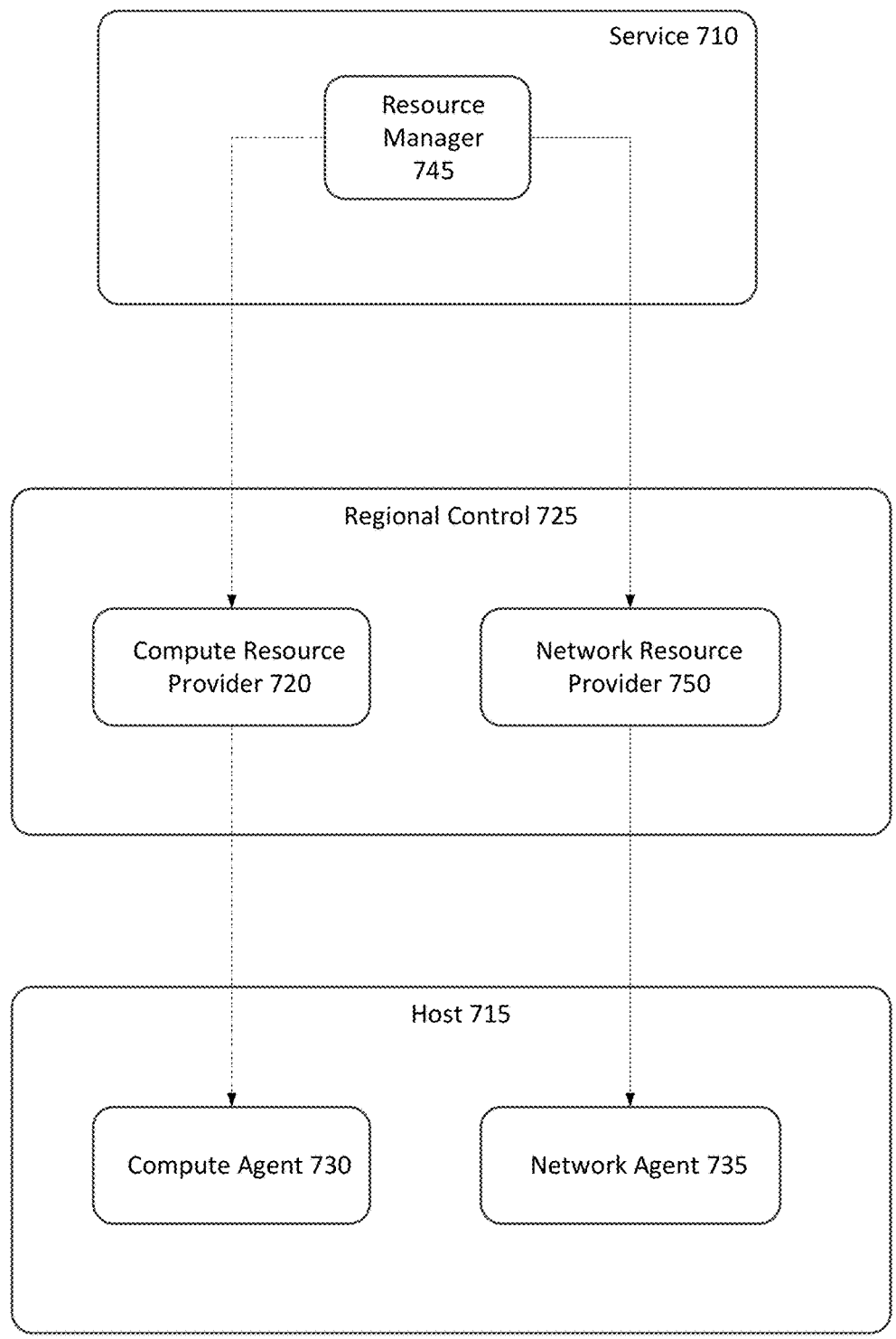
FIG. 7 is a diagram illustrating an architecture for implementing virtual services in accordance with the present disclosure.

FIG. 7 is an illustrative layered cloud-computing architecture 700 that shows how the fNIC enables a networking functionality to be decoupled from the provisioning of compute resources. As shown in the conventional workflow, indicated by the dashed line 705, networking between the service layer 710 and host layer 715 is typically coupled with the provisioning of compute resources from a compute resource provider 720. The compute resource provider may be instantiated, in this example, in a regional control layer 725 that may be utilized in some cloud-computing scenarios involving multiple virtual networks. The compute resource provider interfaces with a compute agent 730 in the host layer which, in turn, interfaces with a network agent 735 to complete the workflow.

By comparison with the conventional workflow 705, the workflow enabled by the fNIC, as indicated by the solid line 740 in FIG. 7, enables the service layer 710 to implement a networking functionality for management and other traffic that is independent from the compute resources. As discussed herein, such independence enables multi-VNet homing, cross-subscription, hot attach, and other scenarios to be implemented by flexibly attaching an fNIC to a parent NIC. Here, the resource manager 745 may interact with a network resource provider 750 to set up an fNIC that operates with the network agent 735 in the host layer 715 to thereby implement the compute resource-independent network functionality.

Figure 8:
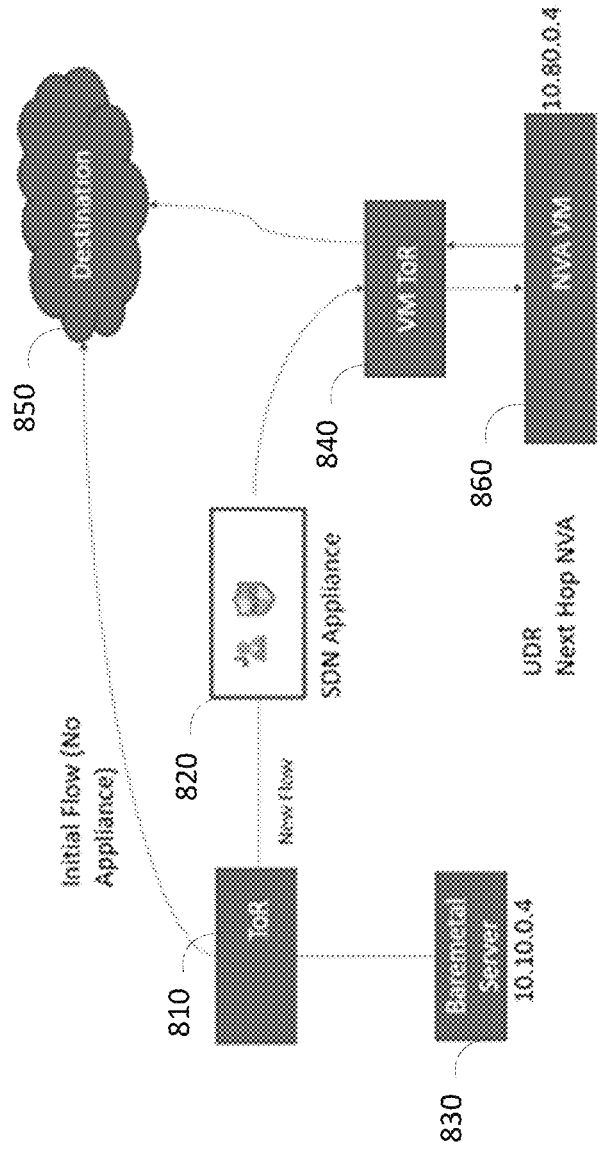
FIG. 8 is a diagram illustrating an architecture in accordance with the present disclosure.

Referring to FIG. 8, illustrated is a bare-metal server 830 that can route a packet to destination 850 through a network virtual appliance virtual machine 860 through a routing table which is applied on the delegated subnet, by the SDN appliance 820.

Figure 9A:
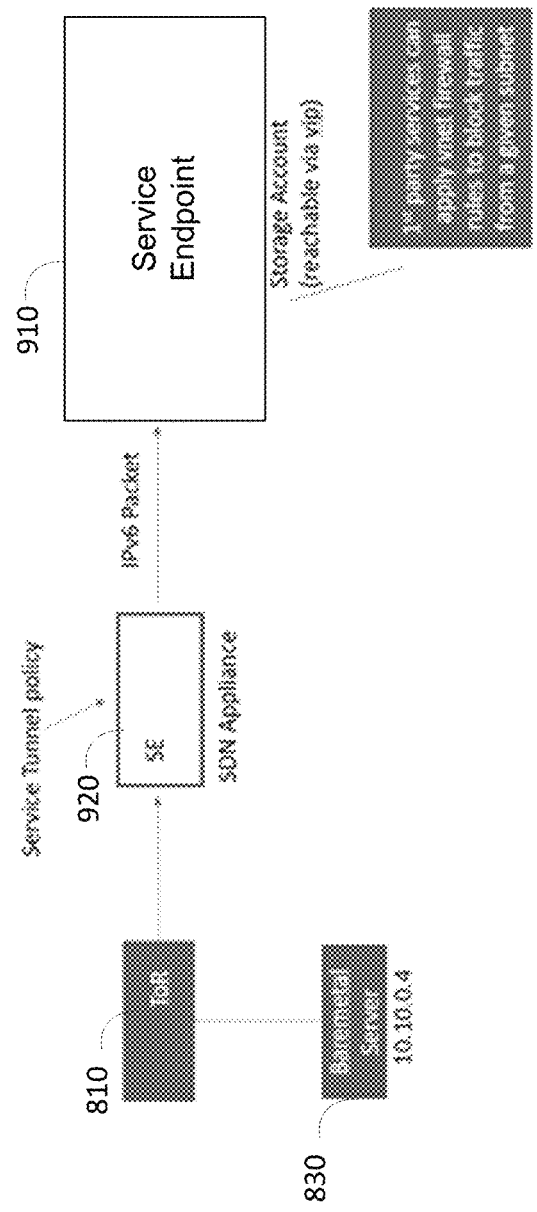
FIG. 9A is a diagram illustrating an architecture in accordance with the present disclosure.
Figure 9B:
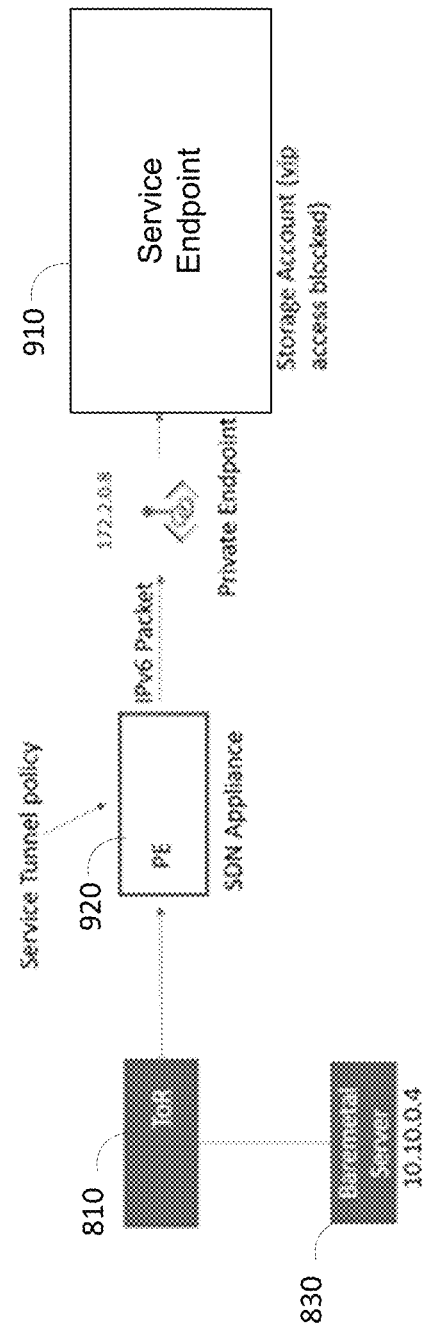
FIG. 9B is a diagram illustrating an architecture in accordance with the present disclosure.

Referring to FIG. 9A and FIG. 9B, illustrated is an example of private endpoints that brings first party services inside a customer Vnet. Illustrated is a bare-metal server 830 that accesses blob storage through a service endpoint 910 which is set up on the bare-metal subnet. A private endpoint (172.2.0.8) may be created that links to blob storage. The storage account may be accessed by bare-metal server 830 through the private endpoint. The SDN appliance 920 may perform all transforms (e.g., V4→V6) that are required to enable the connectivity.

Figure 10:
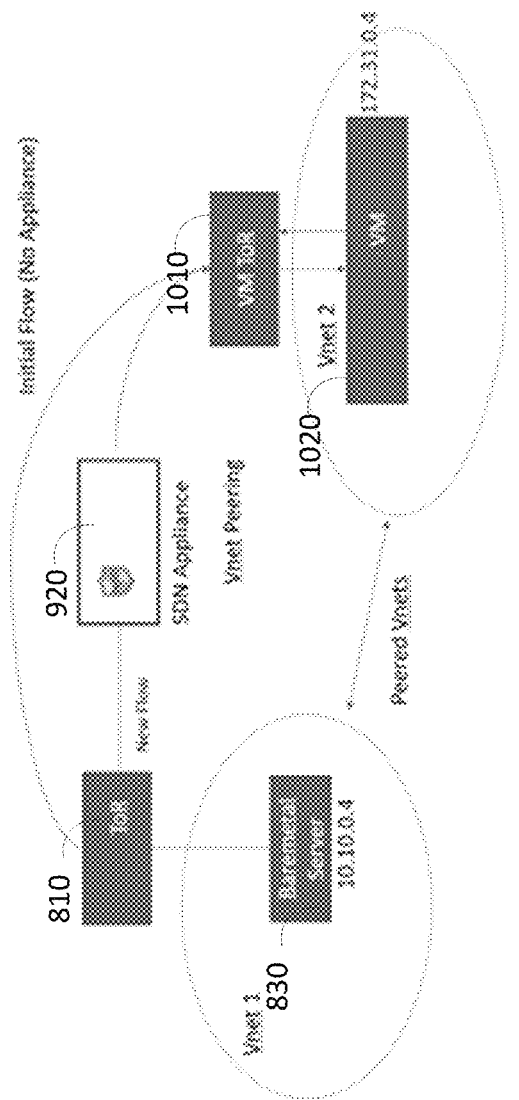
FIG. 10 is a diagram illustrating an architecture in accordance with the present disclosure.

FIG. 10 illustrates cross virtual network connectivity with Vnet peering (regional and global). Illustrated are peered Vnets with baremetal server 830 in Vnet 1 and VM 1020 in Vnet 2.

In the illustrated example scenarios, SDN capabilities may be enhanced by disaggregating policy enforcement from the host and moving it onto SDN appliance strategically placed in the network.

Software defined networking (SDN) is conventionally implemented on a general-purpose compute node. The SDN control plane may program the host to provide core network functions such as security, virtual network, and load balancer policies. Through implementation of the SDN appliance, the bare-metal server (10.10.0.4) may connect to a virtual machine in another virtual network (172.31.0.4) in the same region when regional or global virtual network peering is established. Furthermore, an outbound routing table may be assigned on the bare-metal traffic. In this case, the SDN appliance may provide connectivity to address prefixes of all regionally peered virtual networks.

Figure 11:
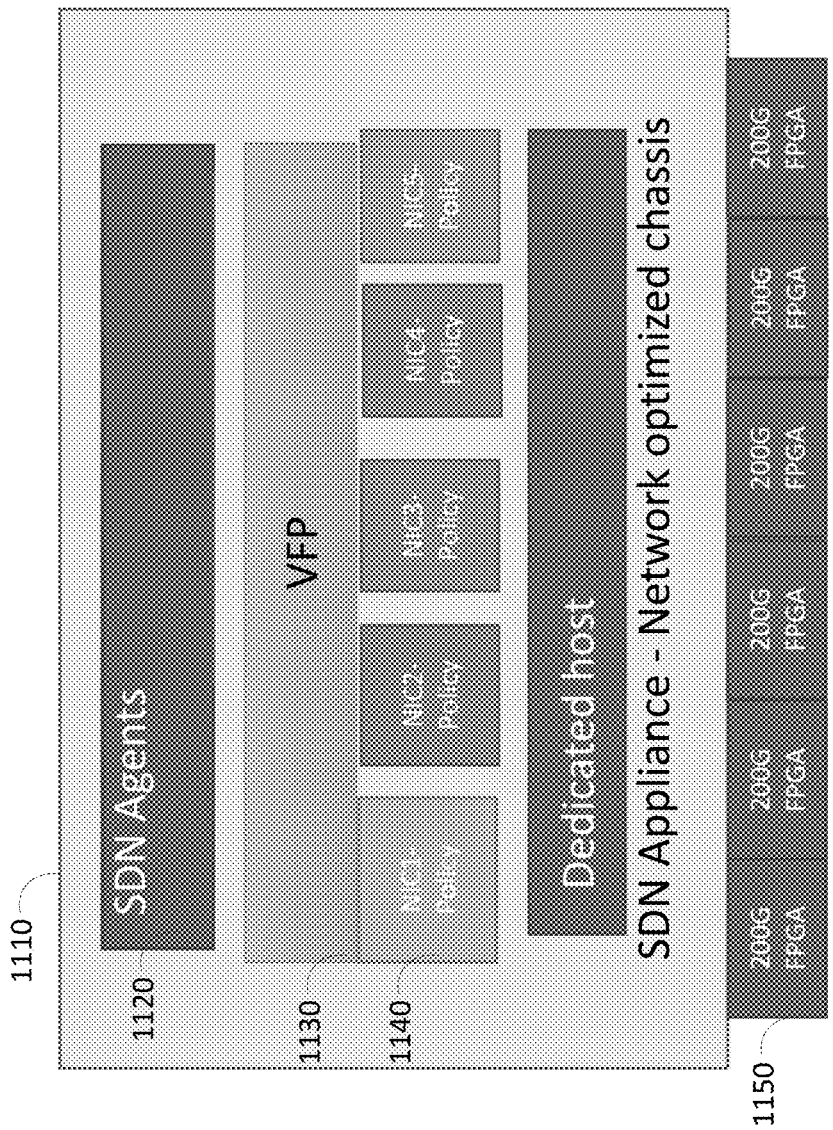
FIG. 11 is a diagram illustrating an appliance in accordance with the present disclosure.

Referring to FIG. 11, illustrated is an example of an SDN appliance 1110 that can enable disaggregation according to some embodiments. In some embodiments, the SDN appliance may enable the use of the SDN control plane to manage the network devices while providing high availability and fault tolerance, as further described herein. FIG. 11 illustrates one example of a network optimized chassis including SND agents 1120, virtual filtering platform (VFP) 1130, policies 1140, and FPGAs 1150. The SKU can be change, and hosts may be used as the SDN appliance if needed. The various embodiments described herein show the use of the SDN appliance as a general concept.

Figure 12:
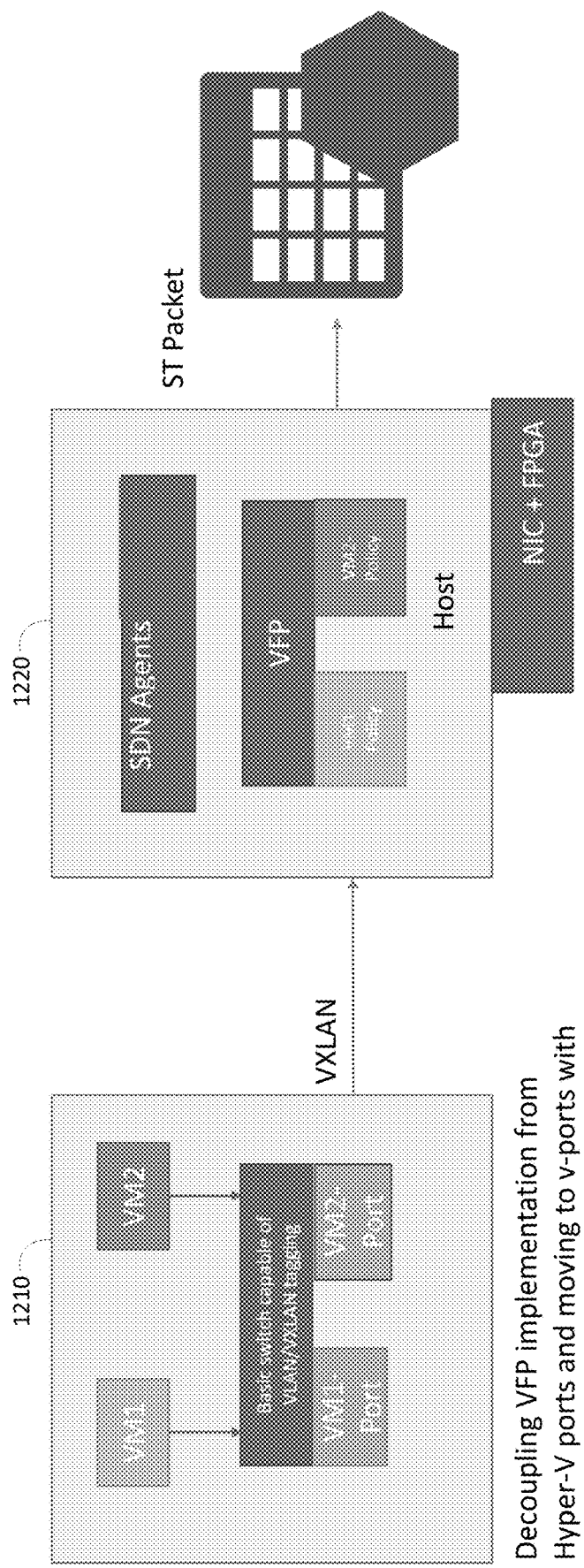
FIG. 12 is a diagram illustrating an appliance in accordance with the present disclosure.

Referring to FIG. 12, illustrated is an example of decoupling virtual filtering platform (VFP) implementation from hypervisor ports and moving to ports with a custom layer 2 identifier.

Figure 13:
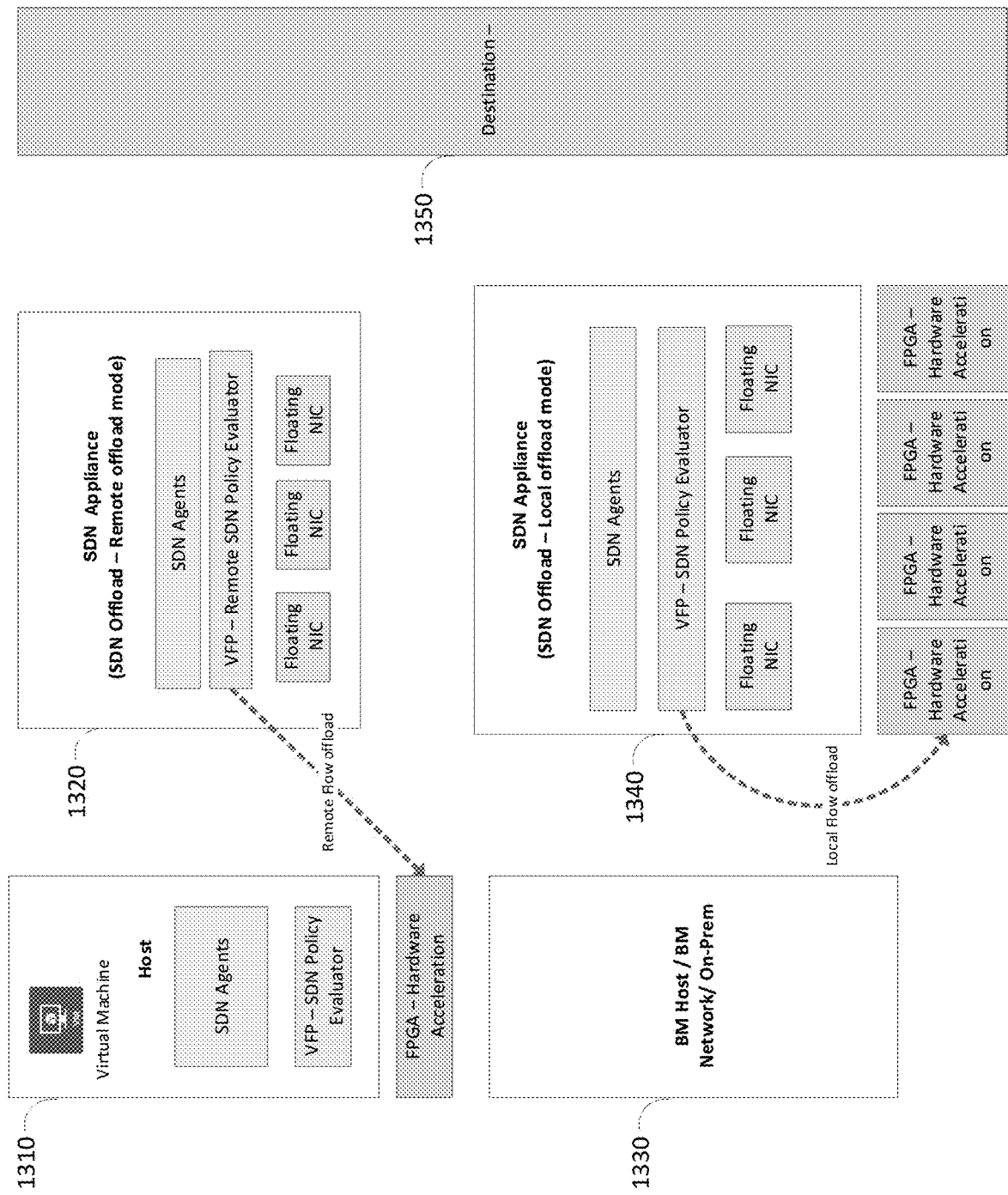
FIG. 13 is a diagram illustrating an appliance in accordance with the present disclosure.

Referring to FIG. 13, illustrated is an example of remote flow offload. If the source is a host appliance, SDN appliance 1320 can serve as a remote policy evaluator and offload the flow to a remote host 1310 after the initial TCP handshake.

In this mode only the initial TCP handshake may be performed though the SDN appliance 1320. In an embodiment, if the source is not a host, the SDN appliance 1340 may offload the flow to a local offload device, such as a field-programmable gate array (FPGA) device. In one embodiment, the described systems and methods may include an FPGA device that is configured to be a hardware acceleration device so that data traffic will be processed in hardware and minimize impact to software, allowing end-to-end traffic to maintain its line rate with reduced latency. In this mode all the packets pass through the SDN appliance.

Figure 14:
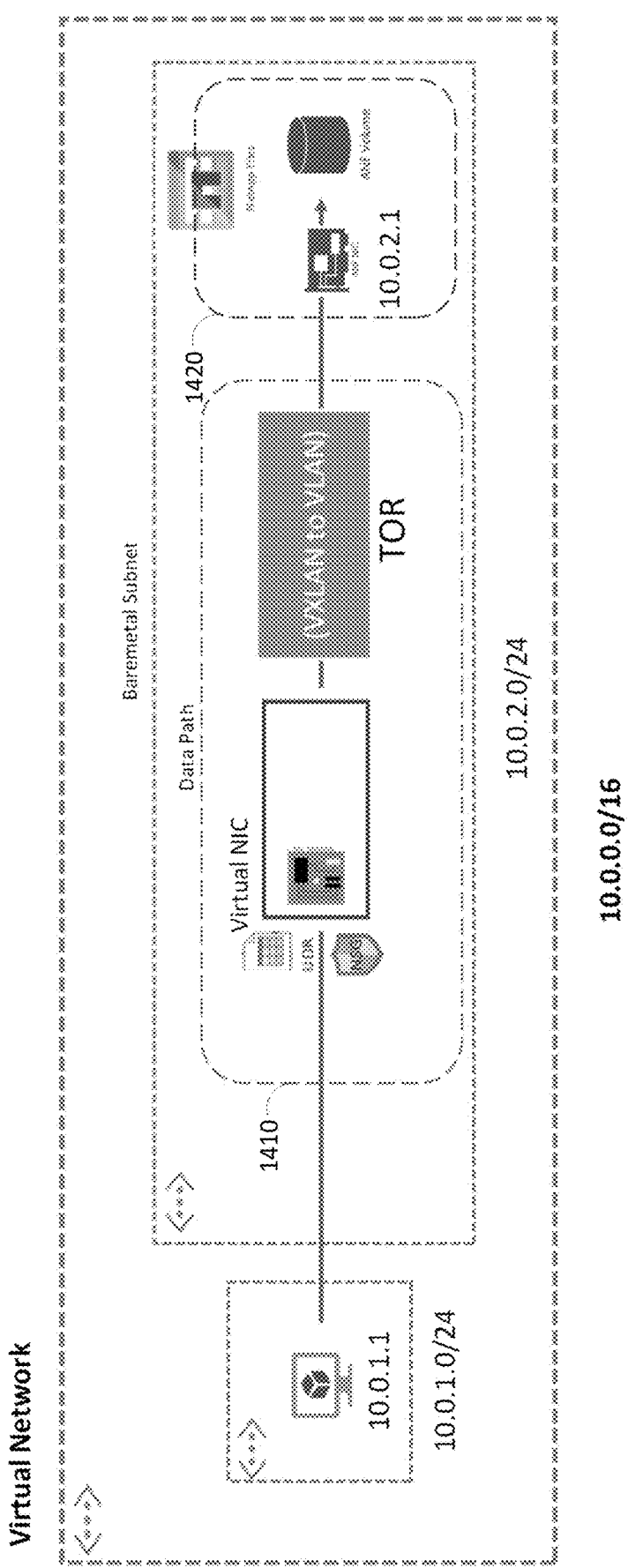
FIG. 14 is a diagram illustrating an example virtual network in accordance with the present disclosure.

Referring to FIG. 14, illustrated is an example of the SDN appliance running a full SDN stack and applying all SDN policies. The lowest level (typically rack level) switches, which may be referred to as a top-of-rack (ToR) switch, may not be capable of supporting all SDN features.

Figure 15:
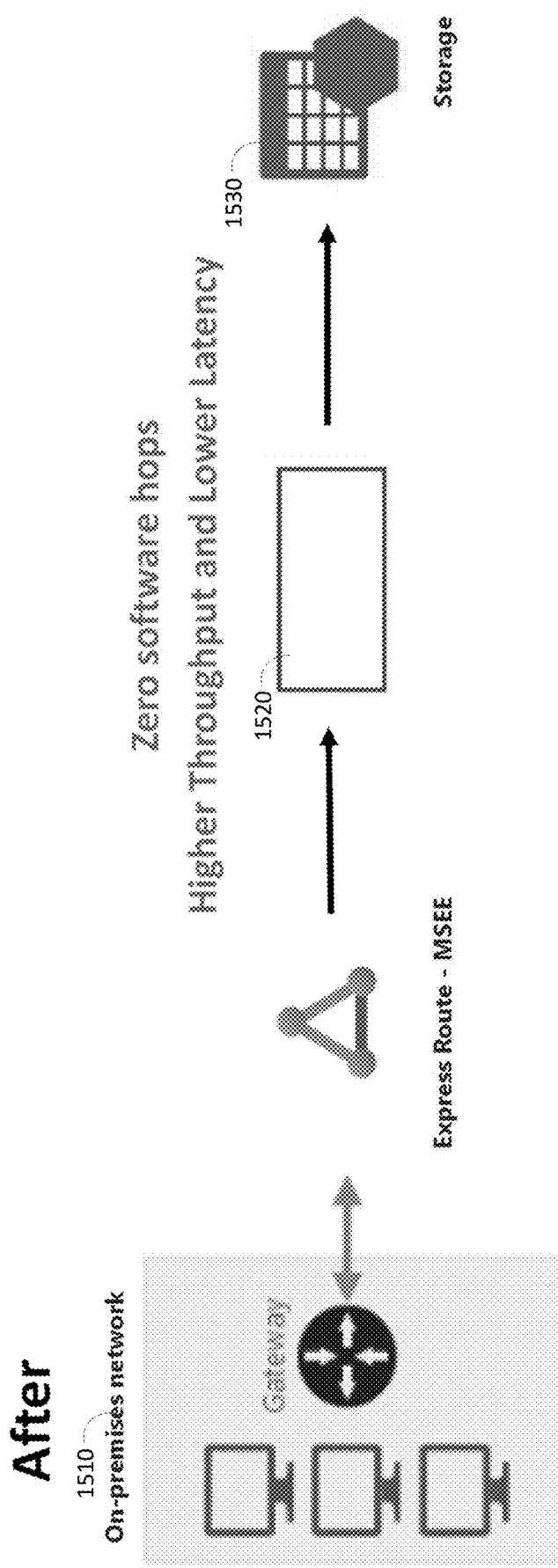
FIG. 15 is a diagram illustrating an example virtual network in accordance with the present disclosure.

Referring to FIG. 15, illustrated is an example of allowing connection from on-premises network 1510 to storage resources 1530 via SDN appliance 1520 through private endpoints.

Figure 16:
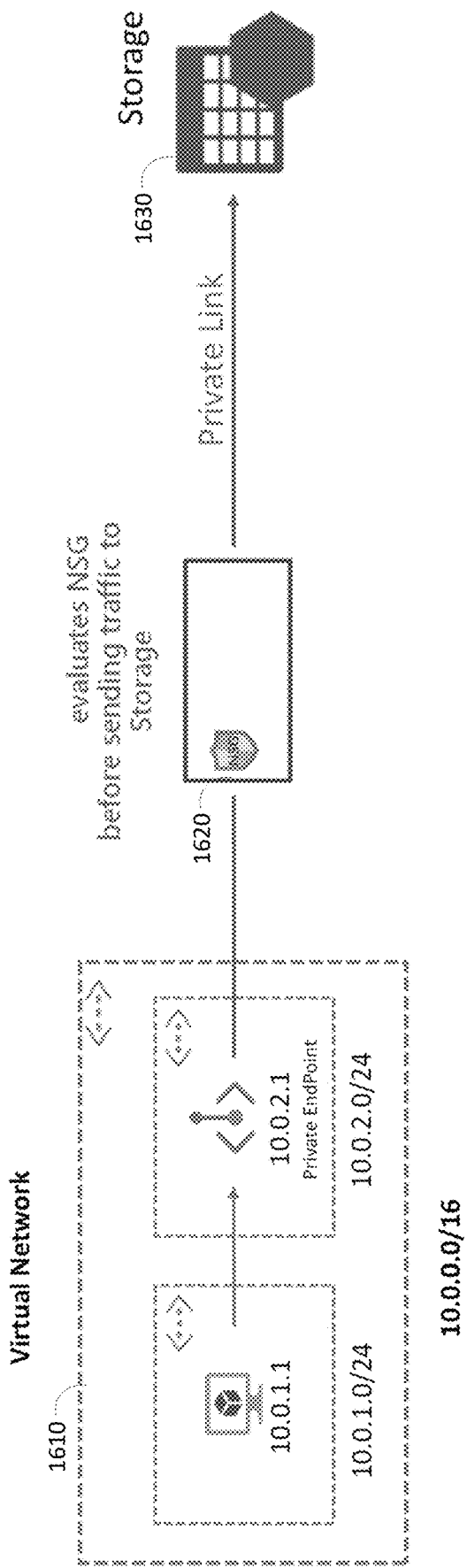
FIG. 16 is a diagram illustrating an example virtual network in accordance with the present disclosure.

Referring to FIG. 16, illustrated is an example of how SDN policies can be applied on fNICs which are not tied to a virtual machine and hence a physical host.

As described above, various embodiments include datacenter networking models that include selectively placed network hops that can apply software defined networking (SDN) policy as a "bump on the wire" (i.e., network traversal point) before data traffic reaches their destination. This can provide improved overall performance, disaggregation from the host, and application of other SDN capabilities before the destination receives data traffic.

In various embodiments described herein, a floating or flexible network interface may be implemented. As used herein, such a floating or flexible network interface may be referred to as a flexible network interface card (fNIC) or generally as a virtual port (vport). In an embodiment, an fNIC may be inserted on a path from the host to the destination and may be configured to apply SDN policies before arriving at the destination. In some embodiments, one or more fNICs may be implemented on an SDN appliance. The point at which the SDN policy is implemented can float between the host and the SDN appliance as appropriate to the flow.

In an embodiment, criteria to determine where to implement the SDN policy for a flow can include, for example: age of the flow, rate of the flow, total bytes transferred on the flow, total number of flows in use at the correspondent host, and the like. Since the SDN policy applied to a flow can comprise multiple aspects, different aspects of the policy can be implemented at different locations.

In conventional SDN applications, application of SDN policy may be based on tuple processing. When implemented as a middle box technology such as with the SDN appliance, traffic destinations behind the middle box in need of SDN operations may be pre-programmed as a fNIC that parses traffic comprised of a combination of custom defined identifiers such as VLAN, MAC, IP, and other information to uniquely identify flows and apply appropriate policy. This layer of programmability can provide flexibility for applying policies in different networking environments and scenarios.

In some embodiments, layer 2 addresses and tenant network identifiers may be used to identify fNICs (e.g., virtual ports) in the SDN appliance. More generally, a virtual port may represent an entity that is not a virtual machine. For example, a virtual port may be associated with a bare-metal server, private endpoint, and the like. Since these entities do not reside on the same device as the switch, a way is needed to identify packets sent to/from the physical entity represented by the virtual port, or more generally, any endpoint that is not the host.

In some implementations that use a rack level switch such as a top-of-rack (ToR) switch, such devices typically do not have the capability to perform transforms. An SDN appliance gateway can be used to host these agents and provide switch functionality, and can further provide transformations and connectivity. The SDN appliance can accept policies that perform transformations. In some embodiments, an agent can be implemented that programs the drivers that run on the SDN appliance. The traffic sent by workloads can be directed through the SDN appliance, which can apply policies and perform transformations on the traffic and send the traffic to the destination. In some configurations, the SDN appliance may include a virtual switch such as a virtual filtering platform The use of an SDN appliance with fNICs or virtual ports may be used, for example, for customer networks that use dedicated hardware. Many switches have destination information but are route-based and typically do not have the capability to apply policies. Furthermore, some destinations such as private links and those that include first or third party services in a customer's virtual network may not have the capability of having policies applied.

With reference to FIG. 11, illustrated is an example SDN appliance 1110 including SDN agents 1120, a network driver capable of performing network transforms such as a virtual filtering platform (VFP) 1130, and policies 1140 associated with fNICs.

With reference to FIG. 12, illustrated is an example of a host 1210 with two virtual machines and two virtual machine ports, using custom layer 2 identifiers. Data traffic is sent to the SDN appliance 1220 where polices are applied before being sent to their destinations. In additional examples, the illustrated disaggregation may be performed for any workloads and applicable policies.

With reference to FIG. 13, illustrated is an example of local and remote flow offload capabilities. For remote flow offload, the host 1320 can serve as a remote policy evaluator and offload the flow to the SDN appliance after an initial TCP handshake. For local flow offload, if the source is not the host, the appliance 1340 can offload the flow to a local FPGA.

SDN appliances can become a single point of failure for software defined networks. Mitigation of faults for SDN appliances must take into account the preservation of transient states (for example, TCP flow state) as well as the locality of the state within the individual SDN appliances. If two appliances are cross-wired to two switches, the single point of failure can be avoided from a physical device standpoint but may introduce state management and expected connectivity issues.

In network scenarios where the FPGA is in the network path between the NIC and the ToR switch, the network may be implemented in some cases by adding support for multiple FPGAs per NIC. When the FPGA is no longer between the NIC and the ToR, packets must still be able to be sent to the NIC from the FPGA. Since there is just a single NIC per multiple FPGAs and the FPGAs are wired to multiple ToRs, a new layer 2 network path is needed between the FPGAs and the NIC using the ToRs. To avoid expanding the layer 2 domain to the higher level switches, the FPGAs may have the capability to ingress a packet to a pipeline on one port, and egress the packet from a different port associated with a different pipeline.

In an embodiment, the SDN appliances can leverage the transient state (for example, the TCP flow state) when processing packets. If that state is not replicated across the set of devices, then the network around those devices must attempt to send packets from the same flow to the same device without overloading the devices or breaking clients in the event of hardware failure or recovery.

An extension to ECMP may be implemented to support layered hashing to enable the switches to meet those demands without requiring the switches to also maintain flow state mappings. A layered hashing approach allows the switch to pick a SDN appliance link (potentially represented as a set of links), out of multiple SDN appliances, and keep sending flows to the same SDN appliance, even if individual link availabilities change within it. If a link fails, the switch may then choose a different link to the same SDN appliance which allows the SDN appliance to still leverage the existing transient state and act appropriately. If an entire SDN appliance fails, then the switch can choose a different SDN appliance to restore connectivity as quickly as possible to maintaining high availability. If a link recovers, flows may be placed back on this link. Flows which are placed back on the link should come from the same SDN appliance, and should not cause flows to switch between appliances.

In an embodiment, layered hashing may be deterministic in the following way across two switches: If switch 1 elects to send flow to SDN Appliance 1 out of SDN Appliance 1 and SDN Appliance 2, then switch 2 must elect to send it to SDN Appliance 1 in the same way. Further, the layered hash behavior should be maintainable across the 2 switches regardless of individual ports' states since these ports can fail individually. The behavior is needed in this way because, for a fault tolerant and redundant system, flows from the higher level network topology can land on any switch at any point in time and any of the appliance links may be up or down on either switch. The 2 switches should be able to do this in a stateless fashion without needing continuous state sharing.

During recovery, when using buckets and/or consistent hashing for ECMP and a recovery from failure updates the mappings for a set of buckets, applying that update over time may reduce the scope of the change at any given time (while prolonging the total time required to complete the recovery). This may be useful if spreading out the impact of recovery is beneficial to the functionality of the overall system (giving client applications with multiple connections a chance to gracefully transition to the valid connections, and giving the network device more of a chance to adapt to the sudden change in traffic behaviors). Since the transition is from a healthy link to a different healthy link, slowing down the transition does not impact availability.

Figure 17:
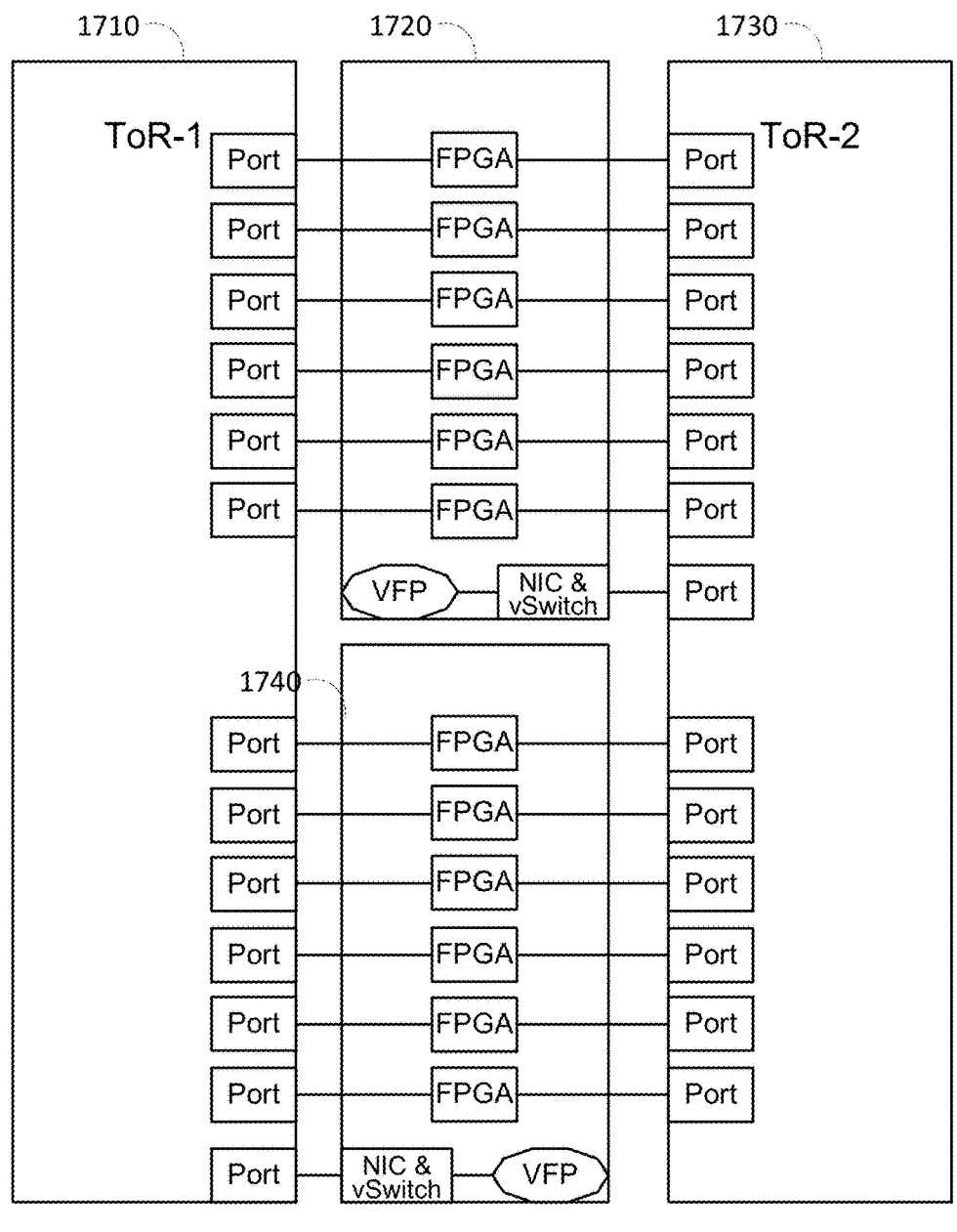
FIG. 17 is a diagram illustrating an architecture in accordance with the present disclosure.
Figure 18:
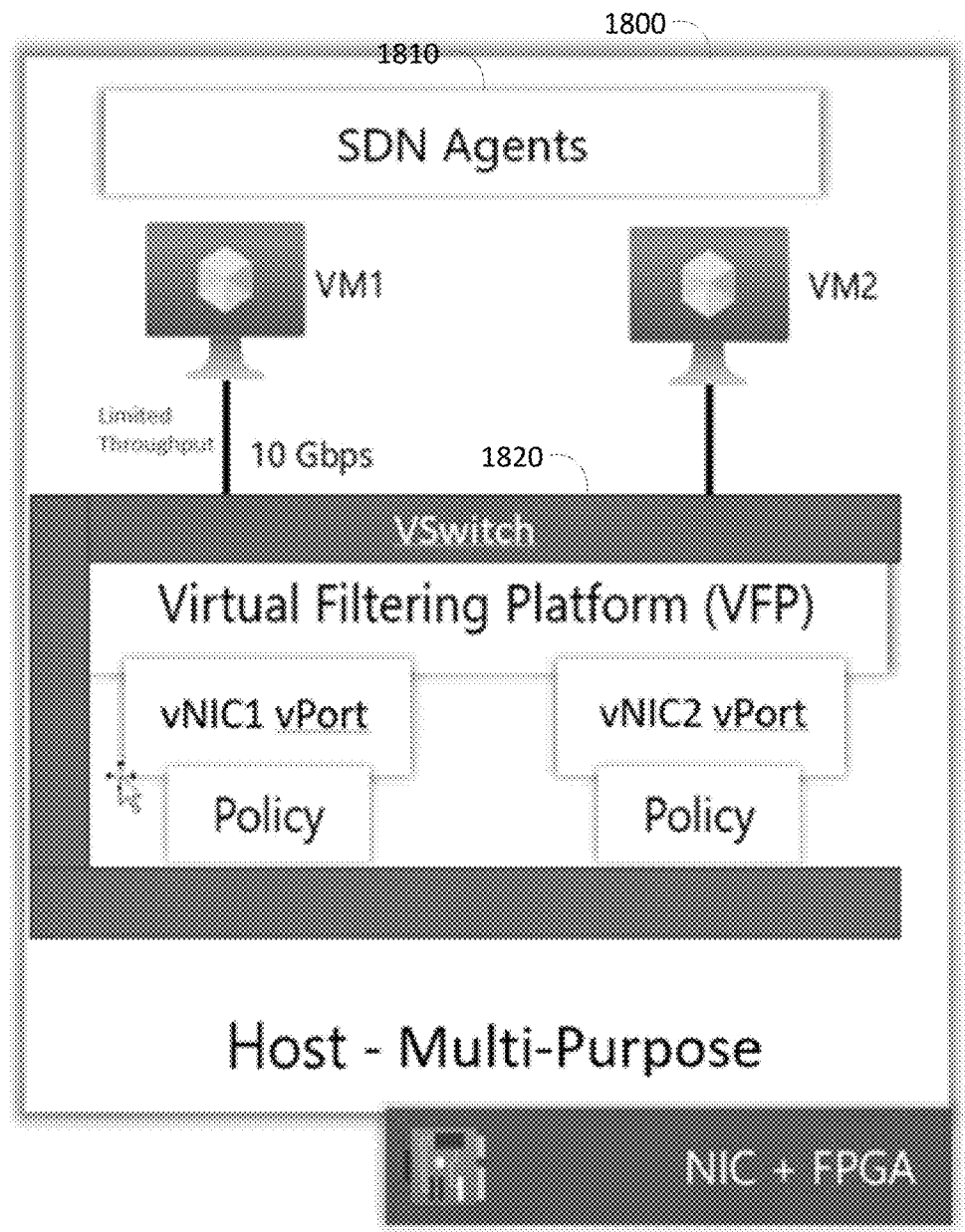
FIG. 18 is a diagram illustrating an architecture in accordance with the present disclosure.
Figure 19:
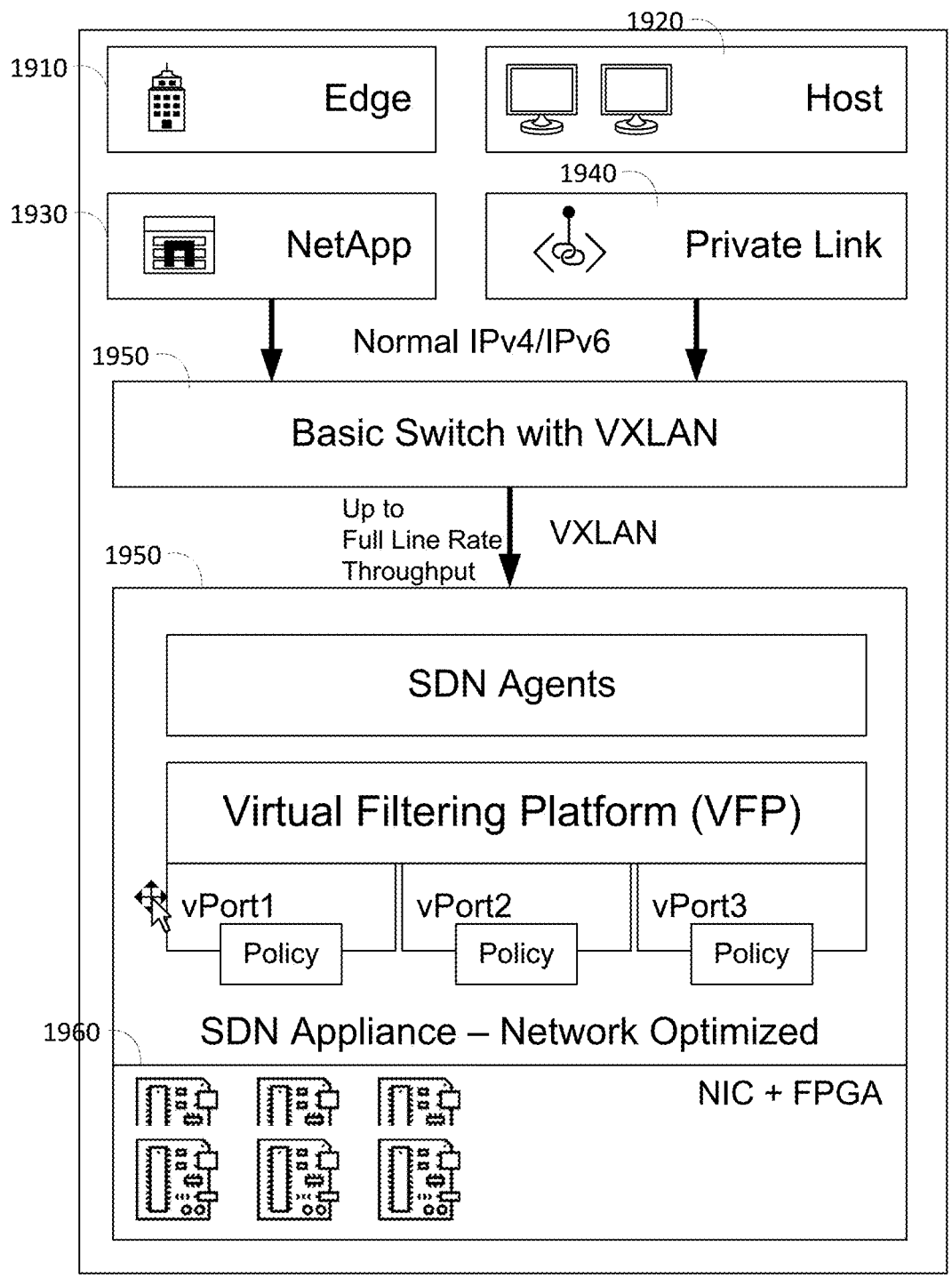
FIG. 19 is a diagram illustrating an architecture in accordance with the present disclosure.

Referring to FIG. 17, illustrated is an example implementation showing dual redundant ToRs 1710 and 1730 cross-wired to dual redundant SDN appliances 1740. In order to provide full fault tolerant capability, states must be maintained so that it can be determined if any given packet is part of an existing request. In the example implementation, the VFP is the controller for the data plane. The two VFPs may not be communicatively coupled, and thus the full statefulness at the TORs should be maintained. The two ToRs should not have any conflicted information so that responses are sent to the correct appliance.

The layered hashing described above should be deterministic in the following way across 2 TORs: If TOR1 elects to send some flow to SDN Appliance 1 out of SDN Appliance 1 and SDN Appliance 2, then TOR 2 must elect to send it to SDN Appliance 1 in the same way. Further the layered hash behavior should be maintainable across the 2 TORs regardless of individual ports' states since these ports can fail individually. The behavior is needed in this way because, for a fault tolerant and redundant system, flows from the higher level network topology can land on any TOR at any point in time and any of the 6 links may be up or down on either TOR.

In the illustrated example, the use of ECMP by the ToRs include treating all ports as equal. However, rather than treating all twelve ports as equal, which may result in loss of state information in the event of a failure, the two banks of ports may be treated as two sets of six. In an embodiment, layered hashing may be implemented by first selecting one of the two banks of ports. Then, a port is selected from the bank. Thus, if one link fails, the bank of ports that included the failed link is selected, allowing for the appropriate VFP to be selected.

In the example, if a port fails and subsequently returns to service, traffic may have been rerouted during the outage. If the revived port is brought back immediately, the corresponding cache will not have been filled with active data and thus there may be a larger number of cache misses, resulting in data lookup latencies. In an embodiment, the revived port can brought back to full operation in the bank of ports in a staggered fashion over a period of time. Since the bank will still have healthy operation with five ports, the graduated return of the sixth port should not impair healthy system operation.

In an embodiment, the VFP can determine pipeline jumping to ensure that data traffic is sent to the corresponding FPGA port on the redundant ToRs.

Certain connected network devices that contain a programmable ASIC (e.g., FPGAs) may lack the networking stack to be able to interact with common networking protocols such as ARP and LACP which are critical for routing and monitoring. Such connected network devices may, for example, be on a server that contains a network interface capable of accepting control traffic. The disclosure describes embodiments for modifying an ARP framework that runs on network devices such that it can provide connectivity to programmable network devices that don't have a native layer 3 networking stack running on them (e.g., FPGAs). Such devices can share a common network interface on the server to bootstrap network connectivity (e.g., ARP). The agents and drivers on the SDN Appliance can program and communicate with these connected devices to complete the bootstrapping of network connectivity.

In scenarios where traffic needs to be directed directly to these connected network devices, in some embodiments, agents and drivers running on the server may be implemented to:

1. Advertise routes to these connected network devices from the network interface on the server. In one example, the same address prefix with multiple next hops to such connected network devices may be advertised. Not all physical devices may support BGP Add-Path, so different next-hops may be advertised on different sessions to the upstream ToR to be able to perform ECMP equally across all of these connected network devices.

2. Generate ARP response packets for connected devices and send them out through the appropriate link.

3. Provide monitoring and availability signals of the link attached to the connected network device. Since these connected network devices are not capable of responding to LACP packets, the BGP sessions established from the agents on the server may provide indication of link availability.

When running in the host of the virtual network, when a packet goes though the stack, the packet may be sent to the VFP which finds the correct transform, selects and offloads the transform to the FPGA, which performs the transforms. However, in the case of an FPGA or other connected device that lacks a traditional networking stack, such devices cannot be communicated with using traditional IP addresses, MAC addresses, and the like as the devices do not have the stack necessary to communicate via the traditional protocols. Such devices therefore cannot respond to ARP, LACP, and other packets. In one example, devices such as a ToR may send BGP packets. Devices such as FPGAs will not be able to respond. In various embodiments disclosed herein, methods and techniques are described to make any programmable device L3 routable that otherwise lacks a networking stack.

In an embodiment, virtual IP addresses may be assigned to the FPGAs. Additionally, to enable responses when packets are addressed to the virtual IP address, the VFP running on the SDN appliance may act as a proxy for the FPGAs and respond on their behalf.

More generally, virtual MAC and IP addresses may be assigned to connected devices, having an agent that maintains or has access to the mapping of these connected devices to a (virtual IP, virtual MAC) pair and a driver that is programmed by this agent, can process network bootstrapping requests and can send the bootstrapping responses through these connected devices.

Software executing on the SDN appliance may be used to bootstrap initial networking for these connected devices (e.g., ARP, link discovery). Once networking is bootstrapped, traffic can be directed to links that are attached to these connected devices without the devices themselves having the need to support network bootstrapping protocols.

The described embodiments may support multiple FPGAs and other connected devices on SDN appliances in multiple different network and physical topologies.

For ARP support, since the FPGAs do not support a network stack, the ARP response may be generated in SDN appliance software. In order for the SDN appliance software to generate the ARP responses, the ARP request must come to the NIC, which is a network stack enabled device in the SDN appliance. The software can generate the ARP response. The ARP response should be sent as if it came from the FPGA link, so that MAC learning can be triggered on the ToR for the FPGA MAC.

Figure 20:
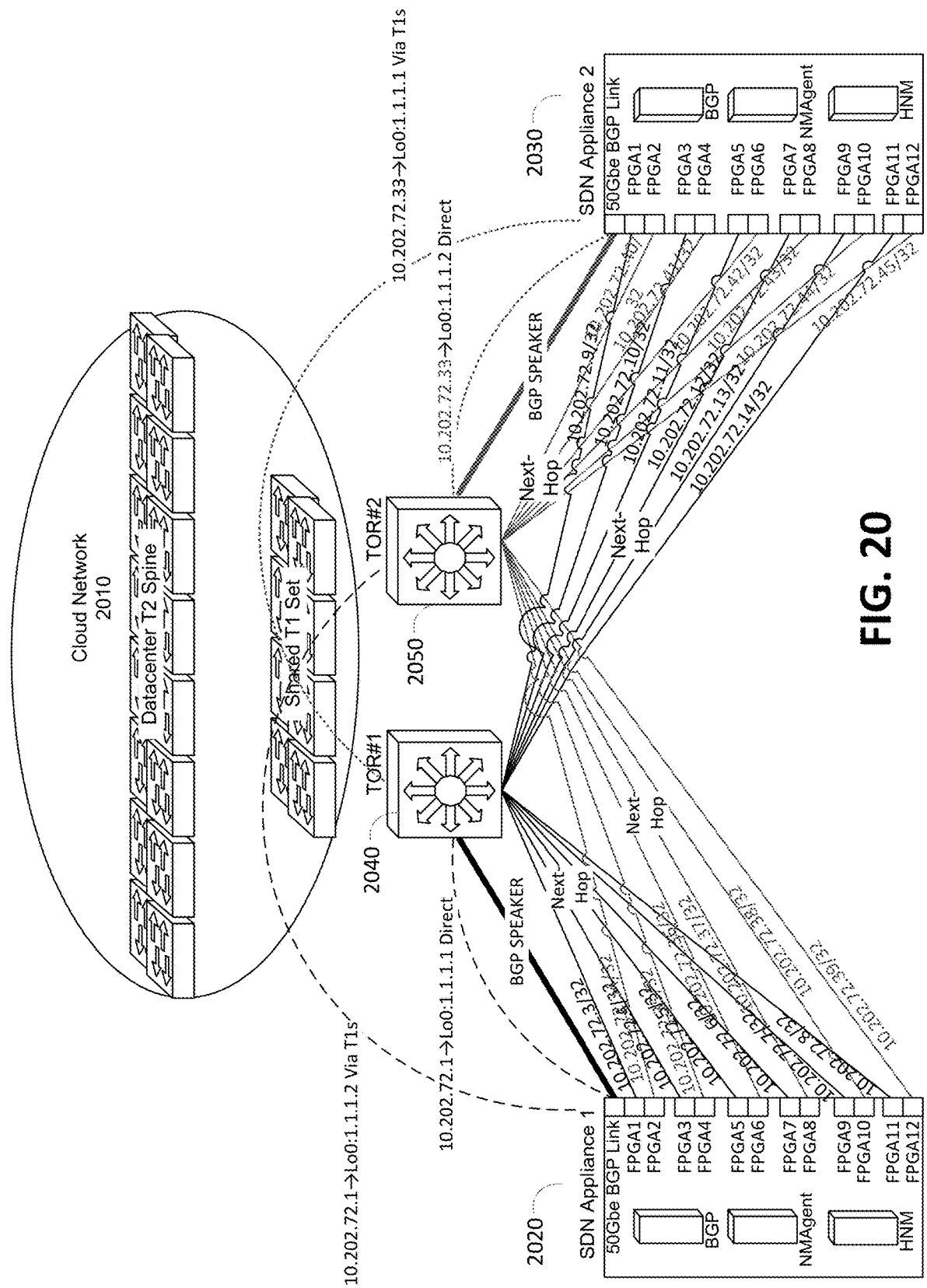
FIG. 20 is a diagram illustrating an architecture in accordance with the present disclosure.

With reference to FIG. 20, in one example, an ARP request packet may be routed to the NIC and the response packet may be configured to appear as coming from an FPGA.

While FPGAs are used to illustrate the described techniques, it should be understood that the techniques may be applied to other types of connected devices such as a GPU.

Continuing with the example of FIG. 20, IP addresses may be assigned to each FPGA of SDN appliances 2020 and 2030 as peers (12 addresses in this example). To the ToRs 2040 and 2050, it appears that there are 12 different peers. In another example, link monitoring with FPGAs may be supported by running LACP to pinged links, informing peers of link status, and removing bad links. When implementing LACP, the FPGAs may be statused as good links.

As shown in the example in FIG. 20, each appliance has 6 FPGAs with 2 ports each. In the illustrated example, each appliance advertises the appliance data path IP address using 6 BGP sessions to 2 ToRs, creating total of 12 BGP sessions via the NIC, with 6 BGP sessions to the second ToR are established via a tier 1 TOR. To create 12 BGP sessions 12 different IPs may be used for the BGP sessions, which are configured as secondary IPs on the NIC. In addition, each BGP session may have one next hop IP corresponding to a FPGA.

Packets destined to the appliance IP may be VXLAN encapsulated. The ToR may perform a hash on the inner packet to choose the next hop IP and forward the packet to the corresponding appliance FPGA. An ARP request for the next hop IP may be responded to by an NM agent running on the appliance with the FPGA MAC address.

Figure 21:
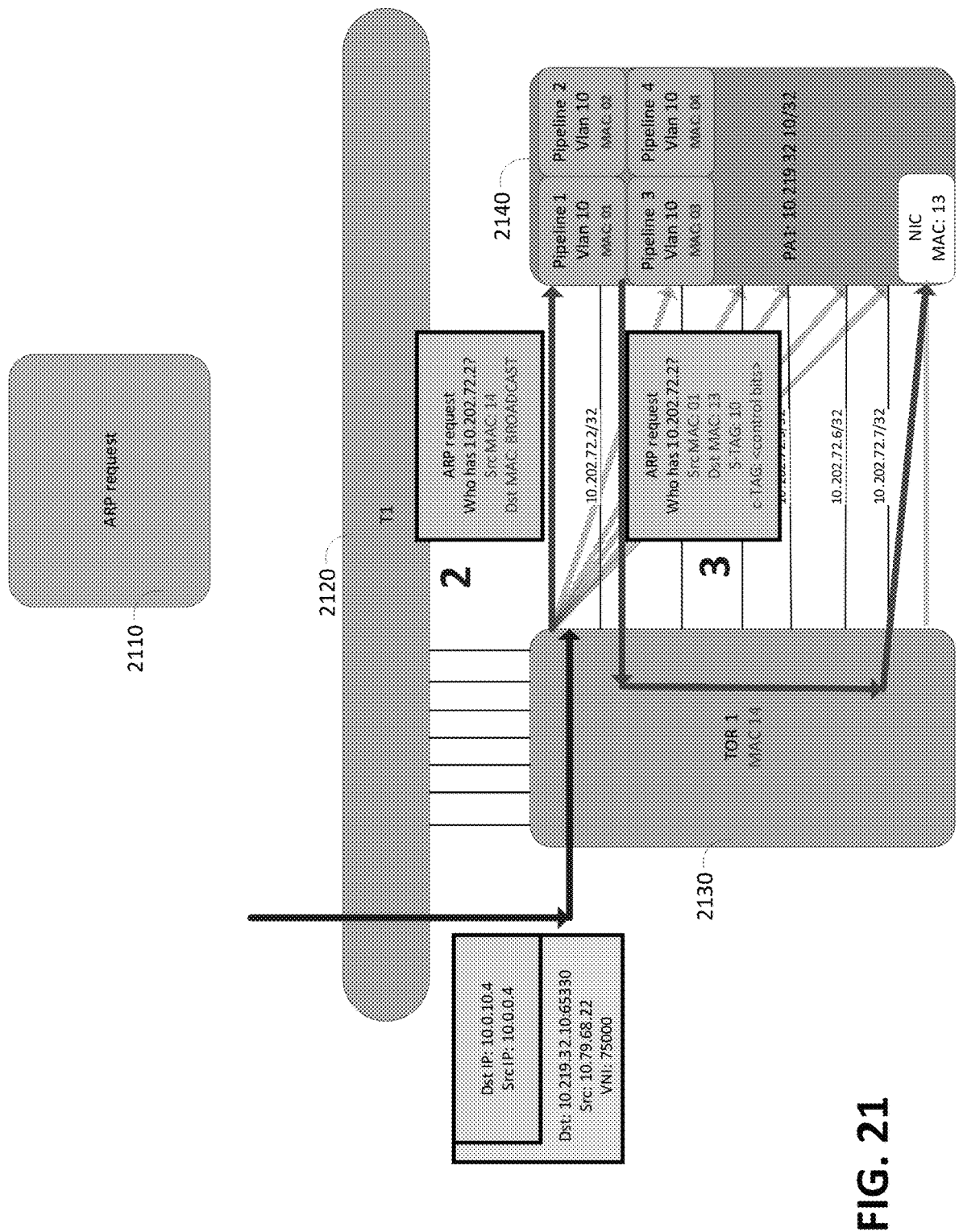
FIG. 21 is a diagram illustrating an architecture in accordance with the present disclosure.

Referring to FIG. 21, illustrated is an exception path ARP example with ARP request 2110.

In some embodiments, an enhanced BGP advertisement framework may be implemented that provides connectivity to programmable network devices that do not have a native layer 3 networking stack running (e.g., FPGAs). Such devices can share a common network interface on the server to bootstrap network connectivity (e.g., ARP). The agents and drivers on the SDN appliance may program and communicate with these connected devices to complete bootstrapping of network connectivity.

Instead of implementing conventional BGP, where a speaker specifies its own IP as next hop for a given NLRI, the next hop may be specified as a virtual IP that is assigned to the connected device. After network bootstrapping, the agents on the server can provide monitoring signals to the BGP speaker to communicate the health of the connected devices. Based on the monitoring health signal, the BGP service may either advertise or withdraw the BGP session associated with the network device. Because such connected devices do not support traditional LACP, the BGP control signal from the BGP speaker can serve as a viable alternative to detect link failures.

Some networks may have a heterogeneous mix of network switches with different BGP capabilities. In order to advertise multiple routes for the same NLRI from the same appliance, all network switches would need to support BGP ADD_PATH capability. If the switch doesn't support ADD_PATH, a second route advertised for the same NLRI from the same peer would result in an implicit withdrawal of the first route. Various embodiments disclosed herein describe a means to ensure homogeneity across all switch types and provide a way to support switches that do not have a BGP ADD_PATH capability. Homogeneity can be ensured by advertising each route on a different session, advertising the same NLRI on a session that uses a different IP address which is assigned to the network interface on the appliance. This makes the upstream network switch treat these routes as if they were coming from different BGP peers and the network switch can perform ECMP across the peers.

The above solution may be used to support multiple FPGAs (connected devices) on SDN Appliances (servers) in multiple different network and physical topologies. In one example, the SDN appliance may have 6 FPGAs with 2 pipelines (ports each).

With reference to FIG. 22, illustrated is an example SDN appliance network according to some embodiments. FIG. 22 illustrates two TORs 2040 and 2050 and two SDN appliances 2020 and 2030 that are cross connected to the two TORs. Each SDN appliance may run a BGP speaker service. Each SDN appliance may create a unique BGP session for each FPGA to the required TOR. The BGP speaker is a service which runs on Appliance #1 and Appliance #2, and informs, over the NIC, availability for each of the FPGAs. There is one BGP session per FPGA, so there are six sessions from Appliance #1 to TOR #1 and six sessions from Appliance #1 to TOR #2 (due to the cross-connection) for IPv4. Similarly there are 12 sessions for IPv6 announcements.

The 6 sessions from appliance #1 to TOR #2 are multi-hop sessions which run across TOR #1→T1 set→TOR #2. This session announces the FPGAs connected from appliance #1 to TOR #2. The BGP announcement is not of the next-hop self, as is standard, but the next-hop of a different interface.

The TORs may not support BGP ADD_PATH attributes, so in order to support such devices, each session may only advertise one next-hop (hence 12 sessions) rather than having all the advertisements happen over a single BGP session and using BGP ADD_PATH to announce multiple next-hops.

The BGP speaker may be provided a special ability to query FPGA availability and selectively announce only the FPGAs which are active and in a good state. This supports having a resilient Layer 3 network.

Monitoring for FPGA availability can be implemented in multiple ways:

Using software register access of the FPGAs so that the FPGA can provide its health to the BGP speaker itself via the software; or Using datapath methods which check availability of the FPGA via a health signal injected into the datapath.

Using the above signals, the speaker may selectively announce the FPGA availability to the TORs and the TOR may forward traffic according to the availability of the FPGA, thereby creating the resilient layer 3 network where changes in FPGA availability keeps the datapath running across other available links/FPGAs.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 23:
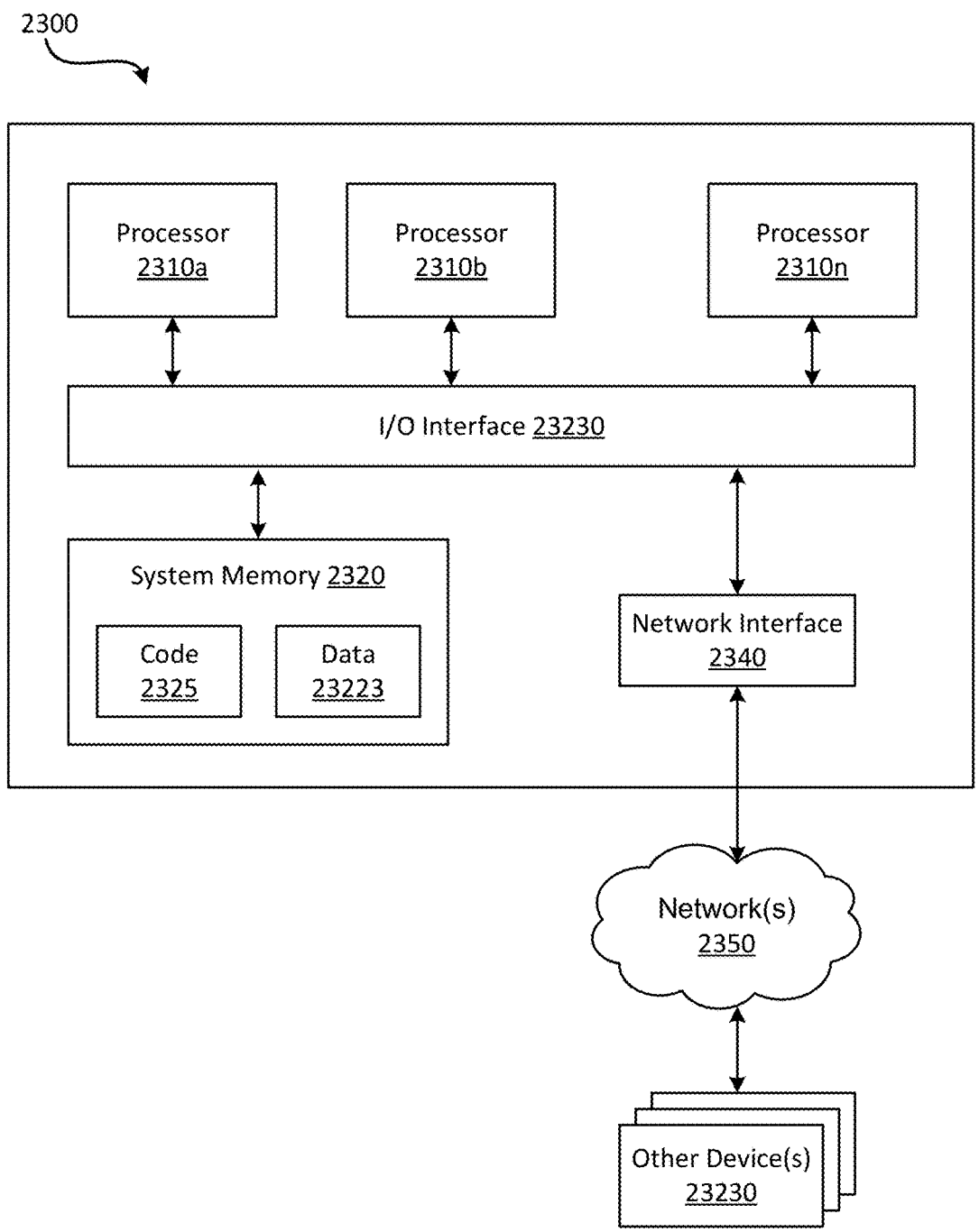
FIG. 23 is an example computing system in accordance with the present disclosure.

FIG. 23 illustrates a general-purpose computing device 2300. In the illustrated embodiment, computing device 2300 includes one or more processors 2310*a*, 2310*b*, and/or 2310*n* (which may be referred herein singularly as "a processor 2310" or in the plural as "the processors 2310") coupled to a system memory 2323 via an input/output (I/O) interface 2330. Computing device 2300 further includes a network interface 2340 coupled to I/O interface 2330.

In various embodiments, computing device 2300 may be a uniprocessor system including one processor 2310 or a multiprocessor system including several processors 2310 (e.g., two, four, eight, or another suitable number). Processors 2310 may be any suitable processors capable of executing instructions. For example, in various embodiments, processors 2310 may be general-purpose or embedded processors implementing any of a variety of instruction set architectures (ISAs), such as the x2323, PowerPC, SPARC, or MIPS ISAs, or any other suitable ISA. In multiprocessor systems, each of processors 2310 may commonly, but not necessarily, implement the same ISA.

System memory 2323 may be configured to store instructions and data accessible by processor(s) 2310. In various embodiments, system memory 2323 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 2320 as code 2325 and data 23223.

In one embodiment, I/O interface 2330 may be configured to coordinate I/O traffic between the processor 2310, system memory 2323, and any peripheral devices in the device, including network interface 2340 or other peripheral interfaces. In some embodiments, I/O interface 2330 may perform any necessary protocol, timing, or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components. Also, in some embodiments some or all of the functionality of I/O interface 2330, such as an interface to system memory 2320, may be incorporated directly into processor 2310.

Network interface 2340 may be configured to allow data to be exchanged between computing device 2300 and other device or devices 23230 attached to a network or network(s) 23230, such as other computer systems or devices as illustrated in FIGS. 1 through 5, for example. In various embodiments, network interface 2340 may support communication via any suitable wired or wireless general data networks, such as types of Ethernet networks, for example. Additionally, network interface 2340 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Figure 24:
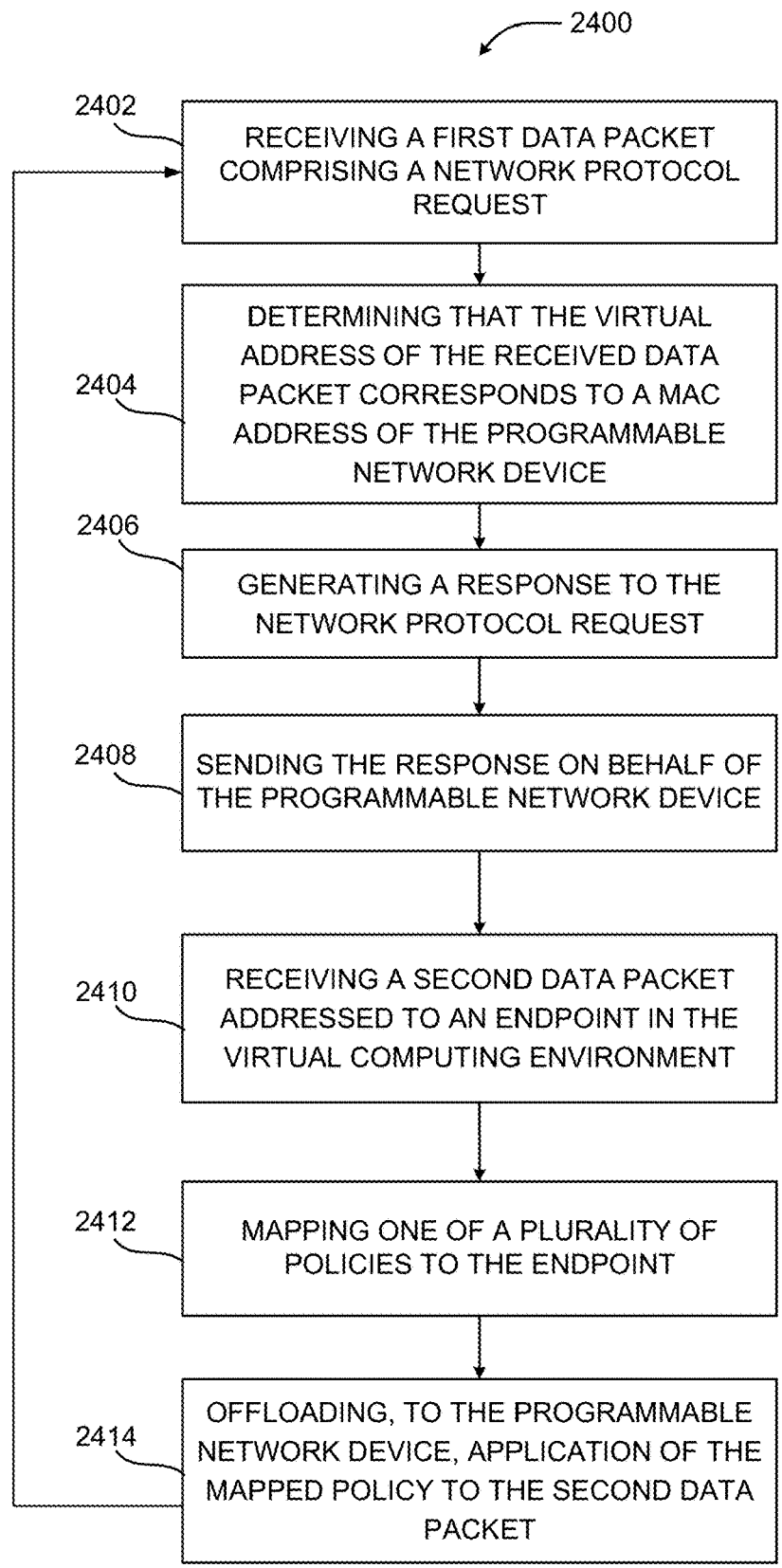
FIG. 24 is an example procedure in accordance with the present disclosure.

FIG. 24 is a flow diagram illustrating aspects of a routine 2400 to be performed by a data processing system for promoting users in a communication session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 2400 is described as running on a system 240, it can be appreciated that the routine 2400 and other operations described herein can be executed on an individual computing device, e.g., computing device 244, or several devices.

Additionally, the operations illustrated in FIG. 24 and the other figures can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 2400 begins at operation 2402, which illustrates receiving, by the SDN appliance, a first data packet comprising a network protocol request. In an embodiment, the first data packet includes a virtual address.

Operation 2404 illustrates based on a mapping of virtual addresses, determining that the virtual address of the received data packet corresponds to a MAC address of the programmable network device.

Operation 2406 illustrates generating a response to the network protocol request based on a configuration of the programmable network device and structured to identify the programmable network device as a source of the response.

Operation 2408 illustrates sending the response on behalf of the programmable network device.

Operation 2410 illustrates receiving, via the programmable network device, a second data packet addressed to an endpoint in the virtual computing environment.

Operation 2412 illustrates mapping one of a plurality of policies to the endpoint.

Operation 2414 illustrates offloading, to the programmable network device by the SDN appliance, application of the mapped policy to the second data packet. In an embodiment, the programmable network device is configured to operate in accordance with the response to the network protocol request.

The disclosure presented herein also encompasses the subject matter set forth in the following clauses:

Clause 1: A system for implementing policies in a software defined network (SDN) of a virtual computing environment, the system comprising:
a programmable network device configured to process data traffic;
one or more processors; and
a memory in communication with the one or more processors, the memory having computer-readable instructions stored thereupon that, when executed by the one or more processors, cause the system to perform operations comprising:
receiving a first data packet comprising a network protocol request, the first data packet including a virtual address;
based on a mapping of virtual addresses, determining that the virtual address of the received data packet corresponds to a MAC address of the programmable network device;
generating a response to the network protocol request based on a configuration of the programmable network device and structured to identify the programmable network device as a source of the response;
sending the response on behalf of the programmable network device;
receiving, via the programmable network device, a second data packet addressed to an endpoint in the virtual computing environment;
mapping one of a plurality of policies to the endpoint; and
offloading, to the programmable network device, application of the mapped policy to the second data packet, wherein the programmable network device is configured to operate in accordance with the response to the network protocol request.

Clause 2: The system of clause 1, wherein the virtual address comprises a virtual IP and virtual MAC.

Clause 3: The system of any of clauses 1-2, wherein the data packet is received by a server having a network interface operable to bootstrap network connectivity for the network devices.

Clause 4: The system of any of clauses 1-3, wherein the network devices are FPGAs or ASICs.

Clause 5: The system of any of clauses 1-4, wherein the identifying is performed by an agent executing on the system.

Clause 6: The system of any of clauses 1-5, wherein routes to the network devices from network interfaces on servers are advertised.

Clause 7: A method for implementing policies in a software defined network (SDN) of a virtual computing environment by a SDN appliance, the SDN appliance configured to disaggregate enforcement of policies of the SDN from hosts of the virtual computing environment, the SDN appliance including a programmable network device configured to process data traffic, the programmable network device lacking a layer 3 networking stack, the method comprising:
receiving, by the SDN appliance, a first data packet comprising a network protocol request, the first data packet including a virtual address;
based on a mapping of virtual addresses, determining that the virtual address of the received data packet corresponds to a MAC address of the programmable network device;
generating a response to the network protocol request based on a configuration of the programmable network device and structured to identify the programmable network device as a source of the response;
sending the response on behalf of the programmable network device;
receiving, via the programmable network device, a second data packet addressed to an endpoint in the virtual computing environment;
mapping one of a plurality of policies to the endpoint; and
offloading, to the programmable network device by the SDN appliance, application of the mapped policy to the second data packet, wherein the programmable network device is configured to operate in accordance with the response to the network protocol request.

Clause 8: The method of clause 11, wherein a same address prefix with multiple next hops to the network devices are advertised.

Clause 9: The method of any of clauses 11 and 12, further comprising providing monitoring and availability signals of links attached to the programmable network devices, wherein sessions can be started or withdrawn.

Clause 10: The method of any of clauses 11-13, wherein ARP responses are generated by the SDN appliance.

Clause 11: The method of any clauses 11-14, wherein the ARP responses are sent as if the responses were sent from a network device link.

Clause 12: The method of any of clauses 11-15, wherein the virtual address comprises a virtual IP and virtual MAC.

Clause 13: The method of any clauses 11-16, wherein the data packet is received by a server having a network interface operable to bootstrap network connectivity for the network devices.

Clause 14: The method of any clauses 11-17, wherein the network devices are FPGAs or ASICs.

Clause 15: A computer-readable storage medium having computer-executable instructions stored thereupon which, when executed by one or more processors of a computing device, cause the computing device to:
receiving a first data packet comprising a network protocol request, the first data packet including a virtual address of a virtual computing environment;
based on a mapping of virtual addresses, determining that the virtual address of the received data packet corresponds to a MAC address of a programmable network device configured to process data traffic;
generating a response to the network protocol request based on a configuration of the programmable network device and structured to identify the programmable network device as a source of the response;
sending the response on behalf of the programmable network device;
receiving, via the programmable network device, a second data packet addressed to an endpoint in the virtual computing environment;
mapping one of a plurality of policies to the endpoint; and
offloading, to the programmable network device, application of the mapped policy to the second data packet, wherein the programmable network device is configured to operate in accordance with the response to the network protocol request.

Clause 16: The computer-readable storage medium of clause 15, wherein the virtual address comprises a virtual IP and virtual MAC.

Clause 17: The computer-readable storage medium of any of clauses 15 and 16, wherein the data packet is received by a server having a network interface operable to bootstrap network connectivity for the network devices.

Clause 18: The computer-readable storage medium of any of clauses 15-17, wherein the network devices are FPGAs or ASICs.

Clause 19: The computer-readable storage medium of any of the clauses 15-18, wherein the identifying is performed by an agent executing on the computing device.

Clause 20: The computer-readable storage medium of any of the clauses 15-19, wherein routes to the network devices from network interfaces on servers are advertised.

The invention claimed is:

1. A system for implementing policies in a software defined network (SDN) of a virtual computing environment, the system comprising:
   a programmable network device configured to process data traffic;
   one or more processors; and
   a memory in communication with the one or more processors, the memory having computer-readable instructions stored thereupon that, when executed by the one or more processors, cause the system to perform operations comprising:
   receiving a first data packet comprising a network protocol request, the first data packet including a virtual address;
   based on a mapping of virtual addresses, determining that the virtual address of the received data packet corresponds to a MAC address of the programmable network device;
   generating a response to the network protocol request based on a configuration of the programmable network device and structured to identify the programmable network device as a source of the response;
   sending the response on behalf of the programmable network device;
   receiving, via the programmable network device, a second data packet addressed to an endpoint in the virtual computing environment;
   mapping one of a plurality of policies to the endpoint; and
   offloading, to the programmable network device, application of the mapped policy to the second data packet, wherein the programmable network device is configured to operate in accordance with the response to the network protocol request.

2. The system of claim 1, wherein the virtual address comprises a virtual IP and virtual MAC.

3. The system of claim 1, wherein the data packet is received by a server having a network interface operable to bootstrap network connectivity for the network devices.

4. The system of claim 1, wherein the network devices are FPGAs or ASICs.

5. The system of claim 1, wherein the identifying is performed by an agent executing on the system.

6. The system of claim 1, wherein routes to the network devices from network interfaces on servers are advertised.

7. A method for implementing policies in a software defined network (SDN) of a virtual computing environment by a SDN appliance, the SDN appliance configured to disaggregate enforcement of policies of the SDN from hosts of the virtual computing environment, the SDN appliance including a programmable network device configured to process data traffic, the programmable network device lacking a layer 3 networking stack, the method comprising:
   receiving, by the SDN appliance, a first data packet comprising a network protocol request, the first data packet including a virtual address;
   based on a mapping of virtual addresses, determining that the virtual address of the received data packet corresponds to a MAC address of the programmable network device;
   generating a response to the network protocol request based on a configuration of the programmable network device and structured to identify the programmable network device as a source of the response;
   sending the response on behalf of the programmable network device;
   receiving, via the programmable network device, a second data packet addressed to an endpoint in the virtual computing environment;
   mapping one of a plurality of policies to the endpoint; and
   offloading, to the programmable network device by the SDN appliance, application of the mapped policy to the second data packet, wherein the programmable network device is configured to operate in accordance with the response to the network protocol request.

8. The method of claim 7, wherein a same address prefix with multiple next hops to the network devices are advertised.

9. The method of claim 7, further comprising providing monitoring and availability signals of links attached to the programmable network devices, wherein sessions can be started or withdrawn.

10. The method of claim 7, wherein ARP responses are generated by the SDN appliance.

11. The method of claim 10, wherein the ARP responses are sent as if the responses were sent from a network device link.

12. The method of claim 7, wherein the virtual address comprises a virtual IP and virtual MAC.

13. The method of claim 12, wherein the data packet is received by a server having a network interface operable to bootstrap network connectivity for the network devices.

14. The method of claim 7, wherein the network devices are FPGAs or ASICs.

15. A non-transitory computer-readable storage medium having computer-executable instructions stored thereupon which, when executed by one or more processors of a computing device, cause the computing device to:
   receiving a first data packet comprising a network protocol request, the first data packet including a virtual address of a virtual computing environment;
   based on a mapping of virtual addresses, determining that the virtual address of the received data packet corresponds to a MAC address of a programmable network device configured to process data traffic;
   generating a response to the network protocol request based on a configuration of the programmable network device and structured to identify the programmable network device as a source of the response;
   sending the response on behalf of the programmable network device;
   receiving, via the programmable network device, a second data packet addressed to an endpoint in the virtual computing environment;
   mapping one of a plurality of policies to the endpoint; and
   offloading, to the programmable network device, application of the mapped policy to the second data packet, wherein the programmable network device is configured to operate in accordance with the response to the network protocol request.

16. The non-transitory computer-readable storage medium of claim 15, wherein the virtual address comprises a virtual IP and virtual MAC.

17. The non-transitory computer-readable storage medium of claim 15, wherein the data packet is received by a server having a network interface operable to bootstrap network connectivity for the network devices.

18. The non-transitory computer-readable storage medium of claim 17, wherein the network devices are FPGAs or ASICs.

19. The non-transitory computer-readable storage medium of claim 15, wherein the identifying is performed by an agent executing on the computing device.

20. The non-transitory computer-readable storage medium of claim 15, wherein routes to the network devices from network interfaces on servers are advertised.

* * * * *